United States Patent
Hesson

Patent Number: 5,808,927
Date of Patent: Sep. 15, 1998

[54] APPARATUS FOR PERFORMING TWO'S COMPLEMENT AND UNSIGNED MULTIPLY ACCUMULATE

[75] Inventor: James Henry Hesson, Chittenden County, Vt.

[73] Assignee: International Business Machines Corporation, Armonk, N.Y.

[21] Appl. No.: 324,991

[22] Filed: Oct. 18, 1994

[51] Int. Cl.$^6$ .................................................. G06F 7/52
[52] U.S. Cl. .......................................... 364/757; 364/760
[58] Field of Search ............................. 364/736, 750.5, 364/754, 757, 758, 760

[56] References Cited

U.S. PATENT DOCUMENTS

| | | | |
|---|---|---|---|
| 3,761,699 | 9/1973 | Sather | 235/759 |
| 4,202,039 | 5/1980 | Epenoy et al. | 364/757 |
| 4,545,028 | 10/1985 | Ware | 364/760 |
| 4,575,812 | 3/1986 | Kloker et al. | 364/760 |
| 4,616,330 | 10/1986 | Betz | 364/728 |
| 4,752,905 | 6/1988 | Nakagawa et al. | 364/760 |
| 4,843,585 | 6/1989 | Williams | 364/759 |
| 4,868,778 | 9/1989 | Disbrow | 364/757 |
| 4,876,660 | 10/1989 | Owen et al. | 364/754 |
| 5,053,987 | 10/1991 | Genusov et al. | 364/736 |
| 5,121,352 | 6/1992 | Hesson | 364/757 |
| 5,265,043 | 11/1993 | Naini et al. | 364/757 |

OTHER PUBLICATIONS

IBM Technical Disclosure Bulletin, vol. 32, No. 2, Jul. 1989, by Gonzalea et al entitled Implicit Control of Operand Format in Multiplier, pp. 335–337.

IBM Technical Disclosure Bulletin, vol. 31, No. 5, Oct. 1988, by Bechade entitled Method for Using the Same Multiplier . . . Multiplication, pp. 308–310.

IBM Technical Disclosure Bulletin, vol. 9, No. 2, Jul. 1966, by Liu et al entitled "Multiplication Using 2's Complement Numbers", pp. 171–173.

*Primary Examiner*—Chuong D. Ngo
*Attorney, Agent, or Firm*—Whitham, Curtis, Whitham & McGinn; Susan Murray

[57] ABSTRACT

A parallel multiply accumulator that provides a two's complement and unsigned multiply has a accumulator structure that minimizes the local and global interconnect lengths so that the design readily scales with advanced complementary metal oxide semiconductor (CMOS) integrated circuit (IC) technologies. The multiplier accumulator is formed with a plurality of identical panels, four in the preferred embodiment. Each identical panel implements the unique compensation necessary to form a multiplication/accumulation. The improved panel design is intended to operate in multiple panel designs and achieves a significant performance improvement. The improved multiply accumulator panel compensation is utilized for both two's complement compensation and according to the position of the panel within the overall array structure. Netlist generators are used to compile the netlist for both the main panel and the full adder arrays to sum the panels. This allows rapid generation of multiple arrays suitable for use in single and double precision arithmetic as well as extended precision arithmetic.

11 Claims, 35 Drawing Sheets

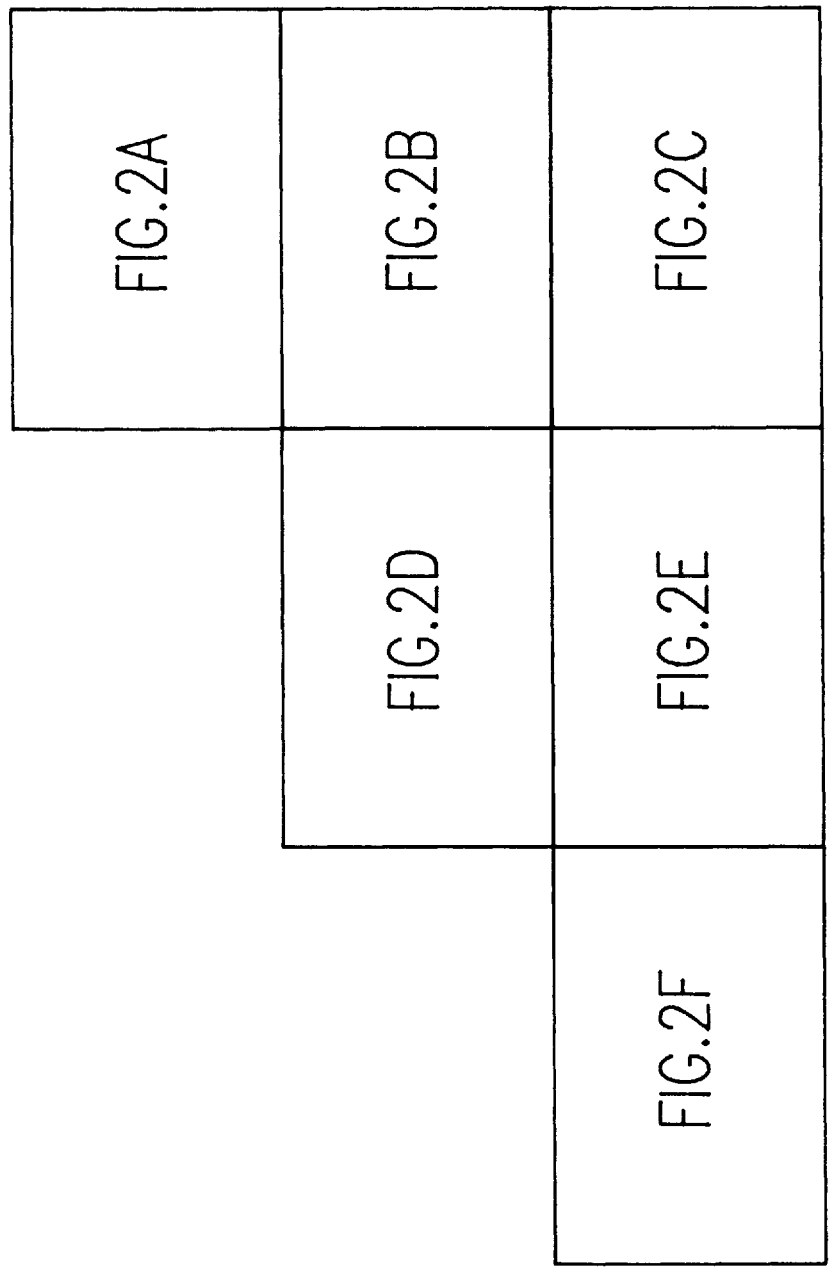

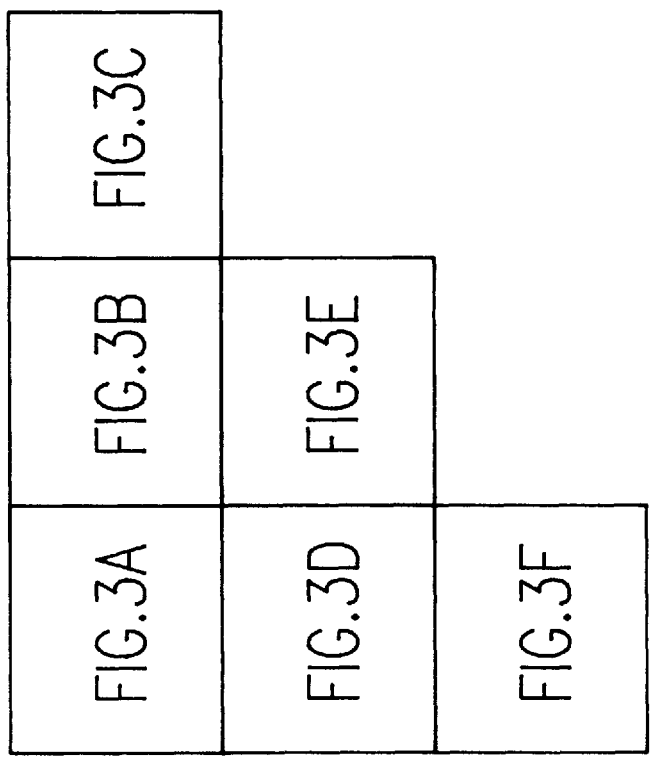

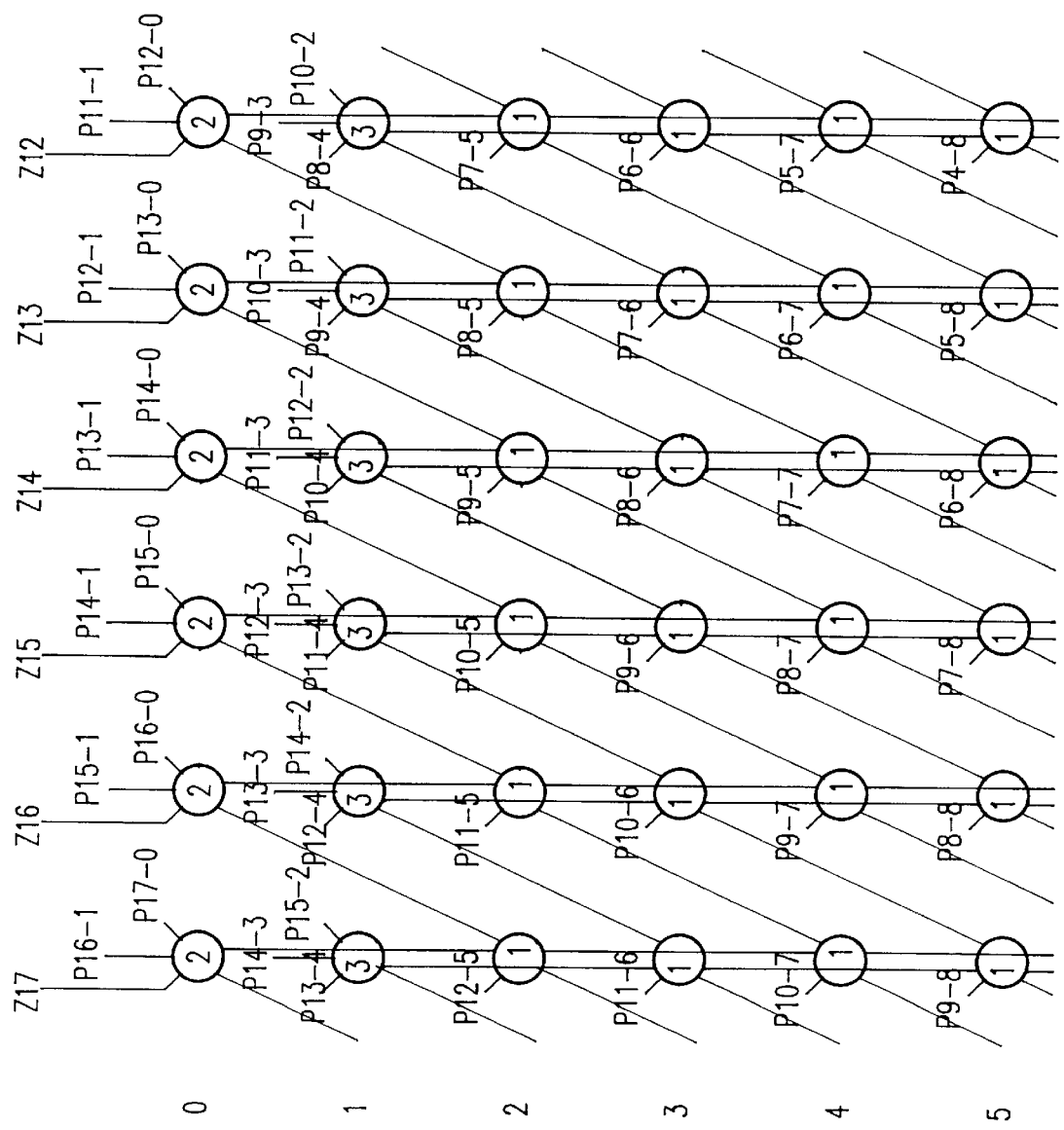

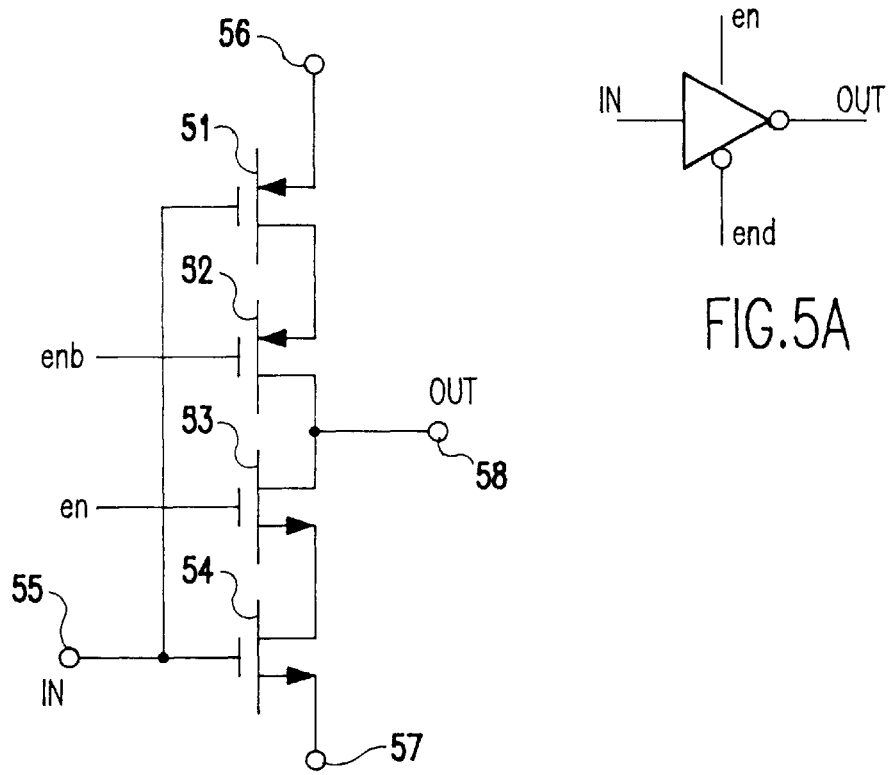
FIG.5
FIG.5A
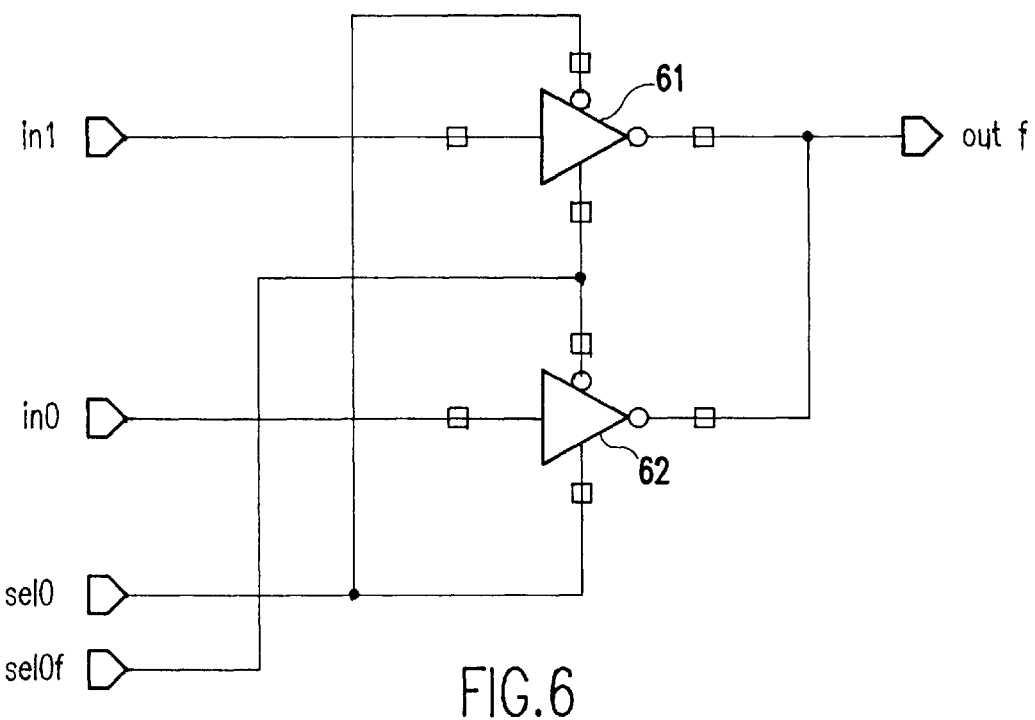
FIG.6

APPARATUS FOR PERFORMING TWO'S COMPLEMENT AND UNSIGNED MULTIPLY ACCUMULATE

BACKGROUND OF THE INVENTION

1. Field of the Invention

The present invention generally relates to arithmetic units for digital computers and, more particularly, to the implementation of a fast two's complement and unsigned parallel multiply accumulator suitable for use in a floating point multiplier and as a general integer multiply accumulator in advanced microprocessors.

2. Description of the Prior Art Problem

In the design and implementation of advanced microprocessors, floating point performance as well as integer performance is becoming a critical requirement. In addition, support for multiple floating point precision as well as signed and unsigned fixed point multiplication can no longer be performed competitively with multi-step iterative methods. Moreover, minimizing instruction latency as well as pipelined performance is critical in achieving the highest possible instruction per cycle performance, even in the light of advanced dynamic instruction scheduling techniques.

SUMMARY OF THE INVENTION

It is therefore an object of the present invention to provide a parallel multiply accumulator that achieves an improved performance level.

It is another object of the invention to provide a two's complement and unsigned multiply accumulator structure that minimizes the local and global interconnect lengths so that the design readily scales with advanced complementary metal oxide semiconductor (CMOS) integrated circuit (IC) technologies.

According to the invention, there is provided a multiplier accumulator that can perform the multiply operation with the input operands in either two's complement or unsigned integers. In the preferred embodiment, the multiply accumulator array is formed with four identical panels, although it will be readily apparent from the description which follows that the invention may be practiced with less than four or greater than four panels. Each identical panel implements the unique compensation necessary to form a multiplication/accumulation unit according to the algorithm described in my U.S. Pat. No. 5,121,352, as well as the additional compensation required to utilize multiple panels in the construction of a composite multiply accumulate array. Whereas the apparatus described in my prior patent was developed to operate as a single panel, the improved panel design of this invention is intended to operate in multiple panel designs, allowing for greater flexibility in design and layout and achieves a significant performance improvement. The improved multiply accumulator panel compensation is utilized for both two's complement compensation and according to the position of the panel within the overall array structure. Netlist generators are used to compile the netlist for both the main panel and the full adder arrays to sum the panels. This allows rapid generation of multiple arrays suitable for use in single and double precision arithmetic as well as extended precision arithmetic of the present example.

The performance improvement realized over the apparatus in my prior U.S. Pat. No. 5,121,352 is approximately 2.25 and approximately 1.5 to 1.7 over previously reported modified Booth multiplication techniques. The new technique can implement a flow through multiply of 64-bit by 66-bit operands and a 130-bit accumulation in less than twenty-eight gate delays. Furthermore, the design can readily be partitioned to achieve a pipelined throughput of sixteen gate delays by placing a pipeline register at the output of each of the multiplier array panels. In current IC process technology, the pipelined unit can perform a multiply accumulate operation in less than three nanoseconds (ns).

BRIEF DESCRIPTION OF THE DRAWINGS

The foregoing and other objects, aspects and advantages will be better understood from the following detailed description of a preferred embodiment of the invention with reference to the drawings, in which:

FIGS. 2 and 2A–2F are diagrams showing the left hand side of one of the multiplier array panels;

FIGS. 3 and 3A–3F are diagrams showing the right hand side of one of the multiplier array panels;

FIG. 5 is a schematic diagram of the circuitry of a tri-inverter buffer circuit, and FIG. 5A is a block diagram showing the symbol for the tri-inverter buffer circuit;

FIG. 6 is a logic unit composed of two tri-inverter buffer circuits showing the logic functions performed;

Figure 22:
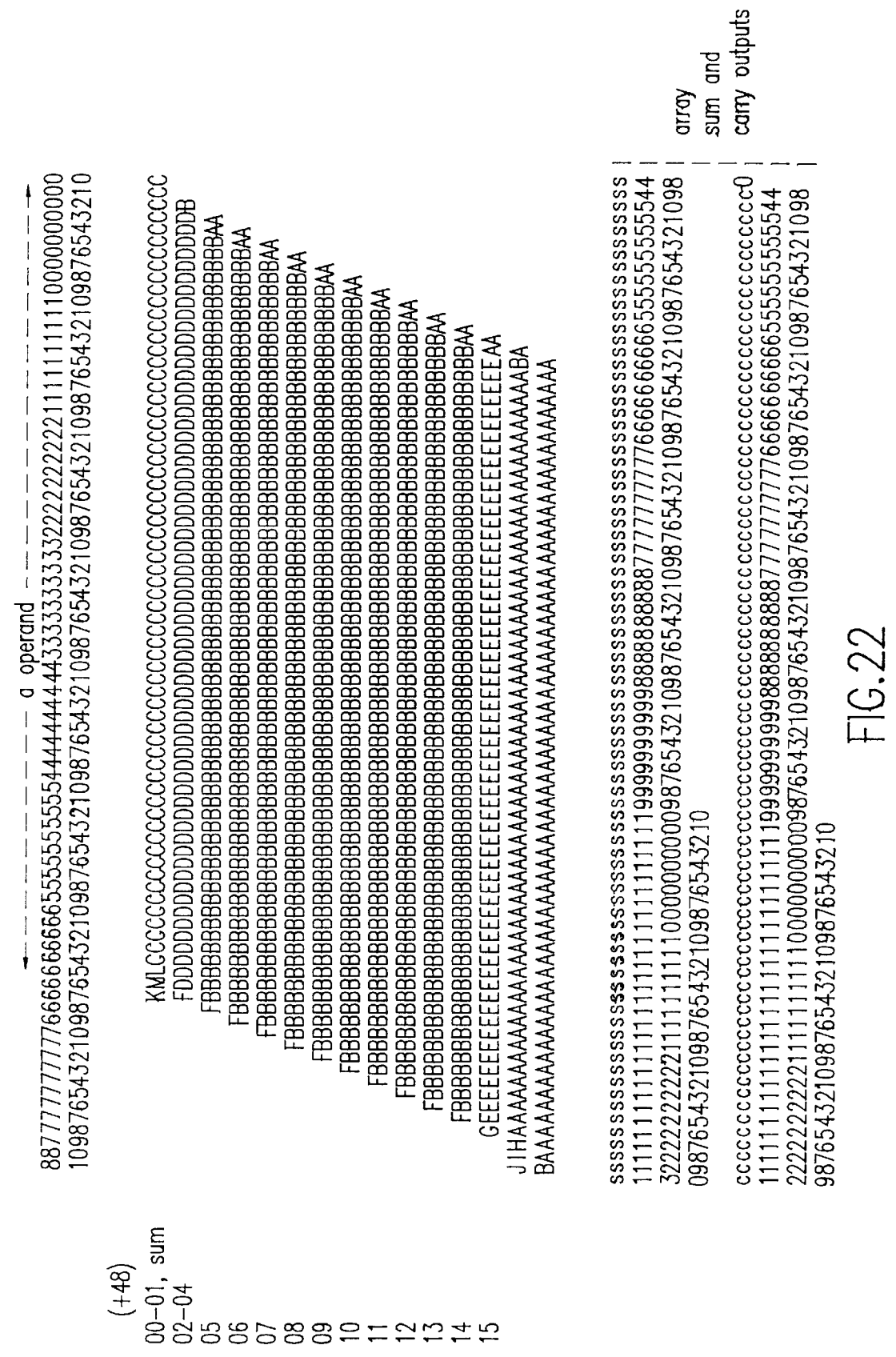

FIGS. 19 to 22 are diagrams illustrating the theoretical design of multiplier panels A, B, C, and D, respectively;

FIG. 23 is a diagram illustrating how the physical design of multiplier panel A is squared up for the most compact construction of the multiplier array panel;

FIG. 24 is a diagram showing how the multiplier array panel outputs are summed via the adder tree structures according to bit positions;

DETAILED DESCRIPTION OF A PREFERRED EMBODIMENT OF THE INVENTION

The multiplier/accumulator has two operands, the multiplicand X and the multiplier Y, and one accumulator input term Z. The multiplier/accumulator performs the operation X·Y+Z, in either of the two's complement mode, unsigned mode, or one of two mixed modes. Input operand X in two's complement format is as follows:

$$X = -a_{m-1}2^{m-1} + \sum_{i=0}^{m-2} a_i 2^i \qquad (1)$$

$$= -a_{m-1}2^m + a_{m-1}2^{m-1} + \sum_{i=0}^{m-2} a_i 2^i$$

Input operand Y in two's complement format is as follows:

$$Y = -b_{n-1}2^{n-1} + \sum_{j=0}^{n-2} b_j 2^j \qquad (2)$$

$$= -b_{n-1}2^n + b_{n-1}2^{n-1} + \sum_{j=0}^{n-2} b_j 2^j$$

The product result of multiplying the multiplicand X by the multiplier Y in two's complement format is as follows:

$$P = a_{m-1}b_{n-1}2^{m+n+2} + \sum_{i=0}^{m-2}\sum_{j=0}^{n-2} a_i b_j 2^{i-j} \qquad (3)$$

$$- \sum_{i=0}^{m-2} a_i b_{n-1} 2^{n-1+i} - \sum_{j=0}^{n-2} a_{m-1} b_i 2^{m-1+j}$$

The accumulator input operand Z in two's complement format is as follows:
Two's complement negative partial product term and accumulator term multiplier-accumulator array compensations are as follows:

$$Z = -c_{m+n-1}2^{m+n+1} + \sum_{i=0}^{m+n-2} c_i 2^i \qquad (4)$$

$$= -c_{m+n-1}2^{m+n} \sum_{i=0}^{m+n-2} c_i 2^i$$

Product Term: $-\sum_{i=0}^{m-1} a_i b_{n-1} 2^{n-1+i} \rightarrow$

| 0 | $\overline{b_{n-1}}$ | $b_{n-1}$ | $\overline{a_{m-2}}b_{n-1}$ | $\overline{a_{m-3}}b_{n-1}$ | ... | $\overline{a_0}b_{n-1}$ |
| 1 | 1 | 0 | 0 | 0 | ... | $b_{n-1}$ |

Product Term: $-\sum_{j=0}^{n-2} a_{m-1} b_i 2^{m-1+j} \rightarrow$

| 0 | $\overline{a_{m-1}}$ | $a_{m-1}$ | $\overline{a_{m-1}}b_{n-2}$ | $\overline{a_{m-1}}b_{n-3}$ | ... | $\overline{a_{m-1}}b_0$ |
| 1 | 1 | 0 | | | ... | $a_{m-1}$ |

Accumulator Operand:
| 0 | $\overline{c_{m+n-1}}$ | $c_{m+n-2}$ | $c_{m+n-3}$ | ... | $c_0$ |
| 1 | 1 | | | ... | |

Figure 1:
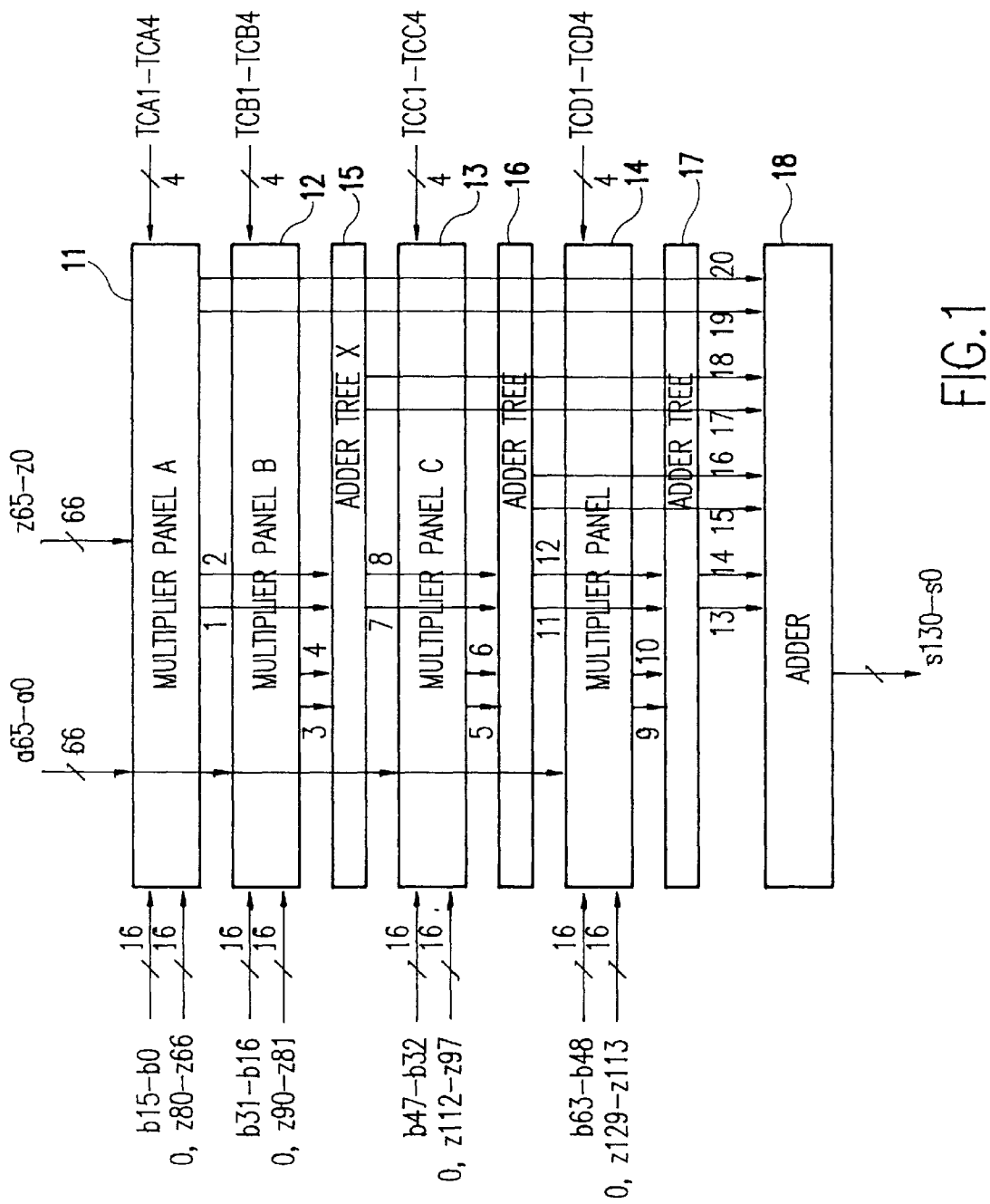
FIG. 1 is a block diagram of the two's complement and unsigned integer multiply/accumulator according to the invention.
Figure 2A:
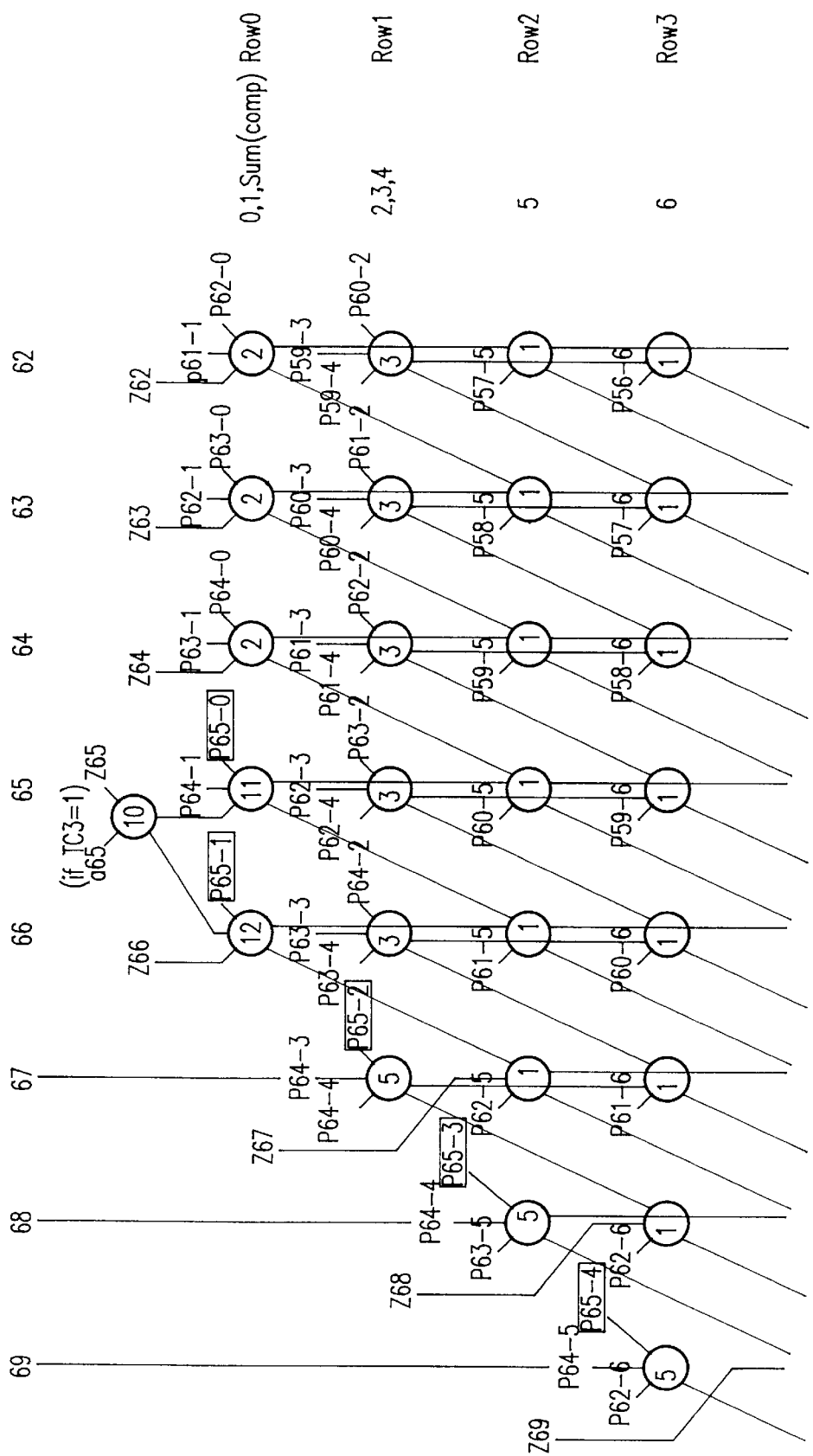
Figure 2B:
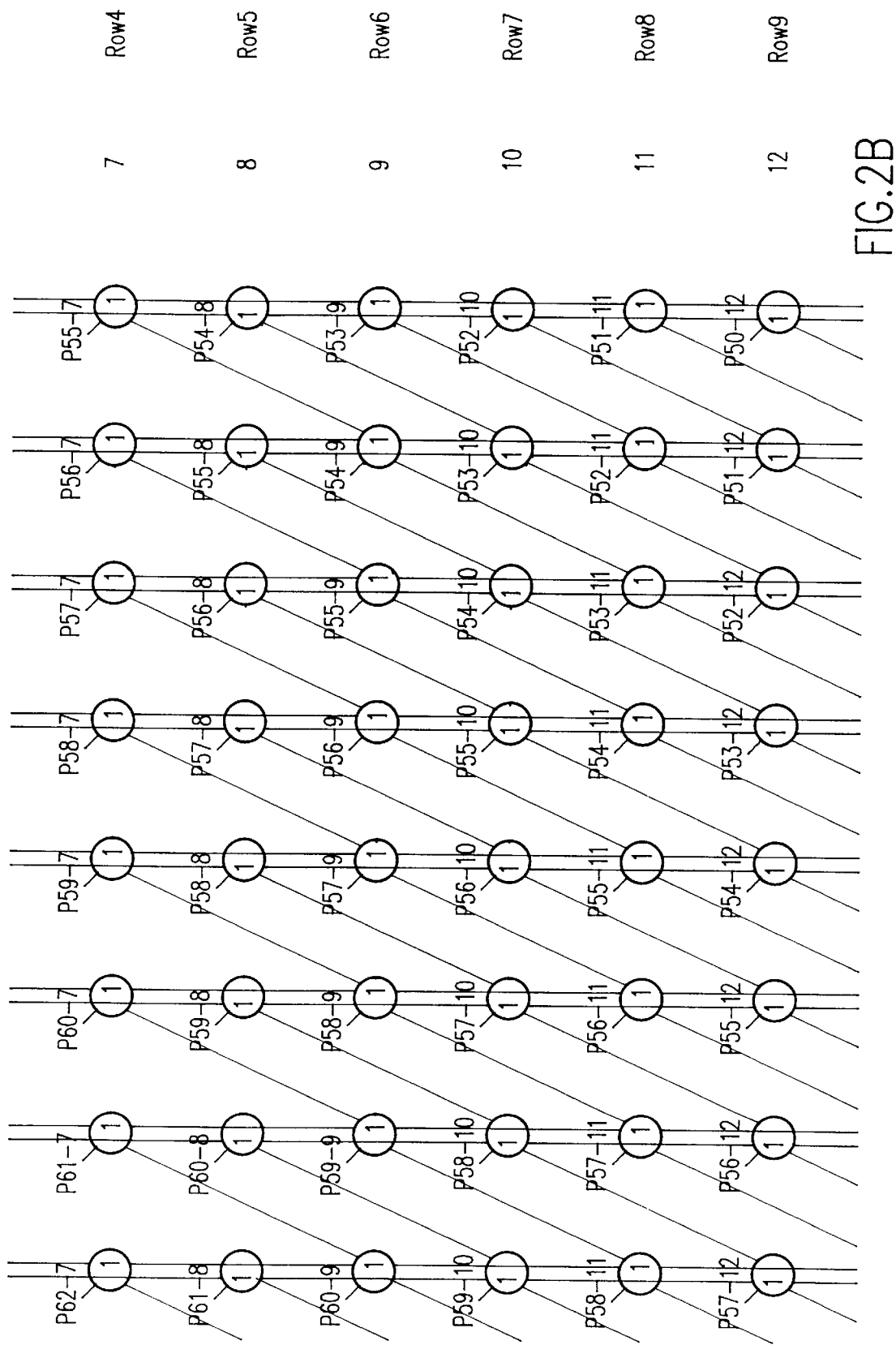
Figure 2C:
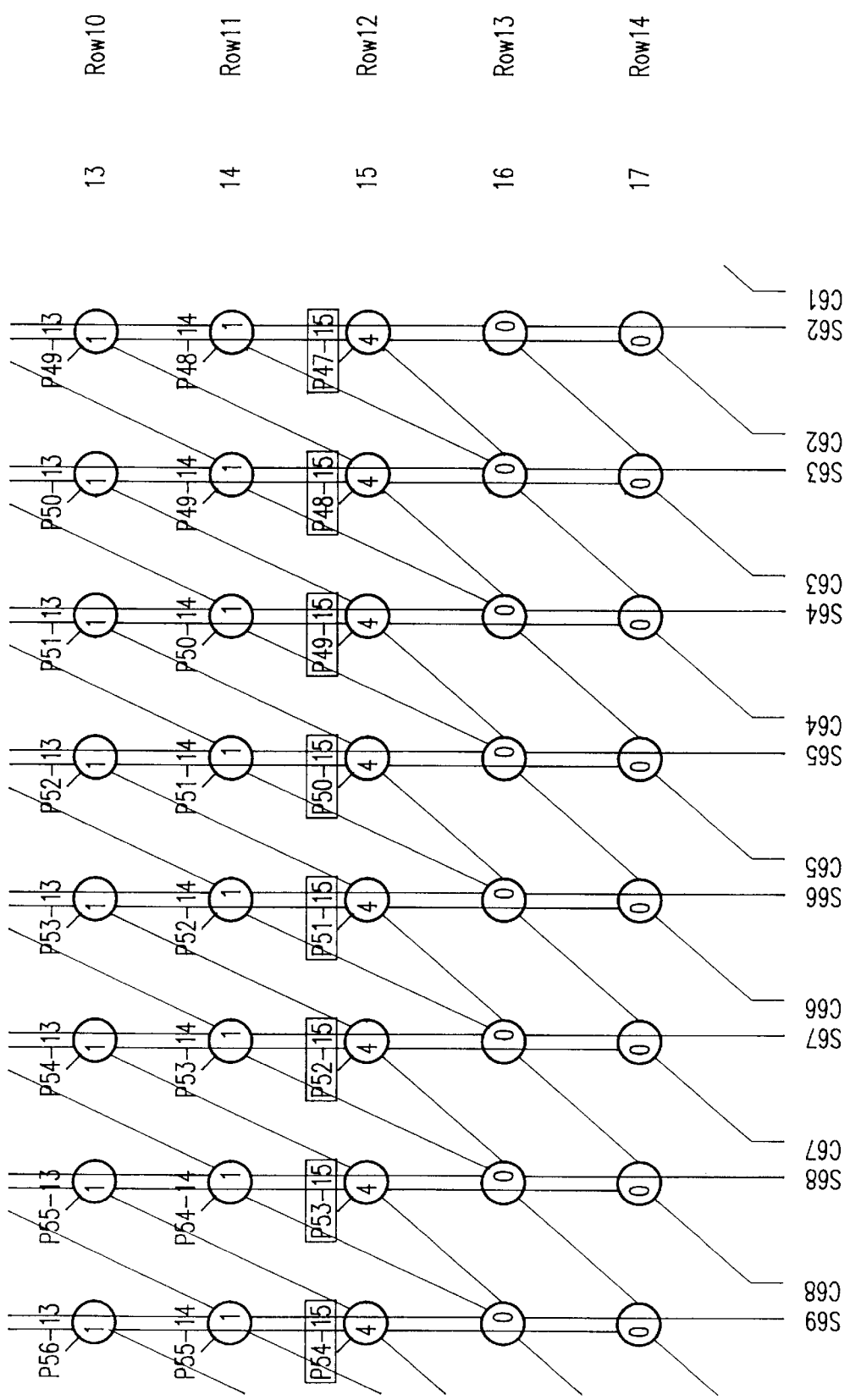
Figure 2D:
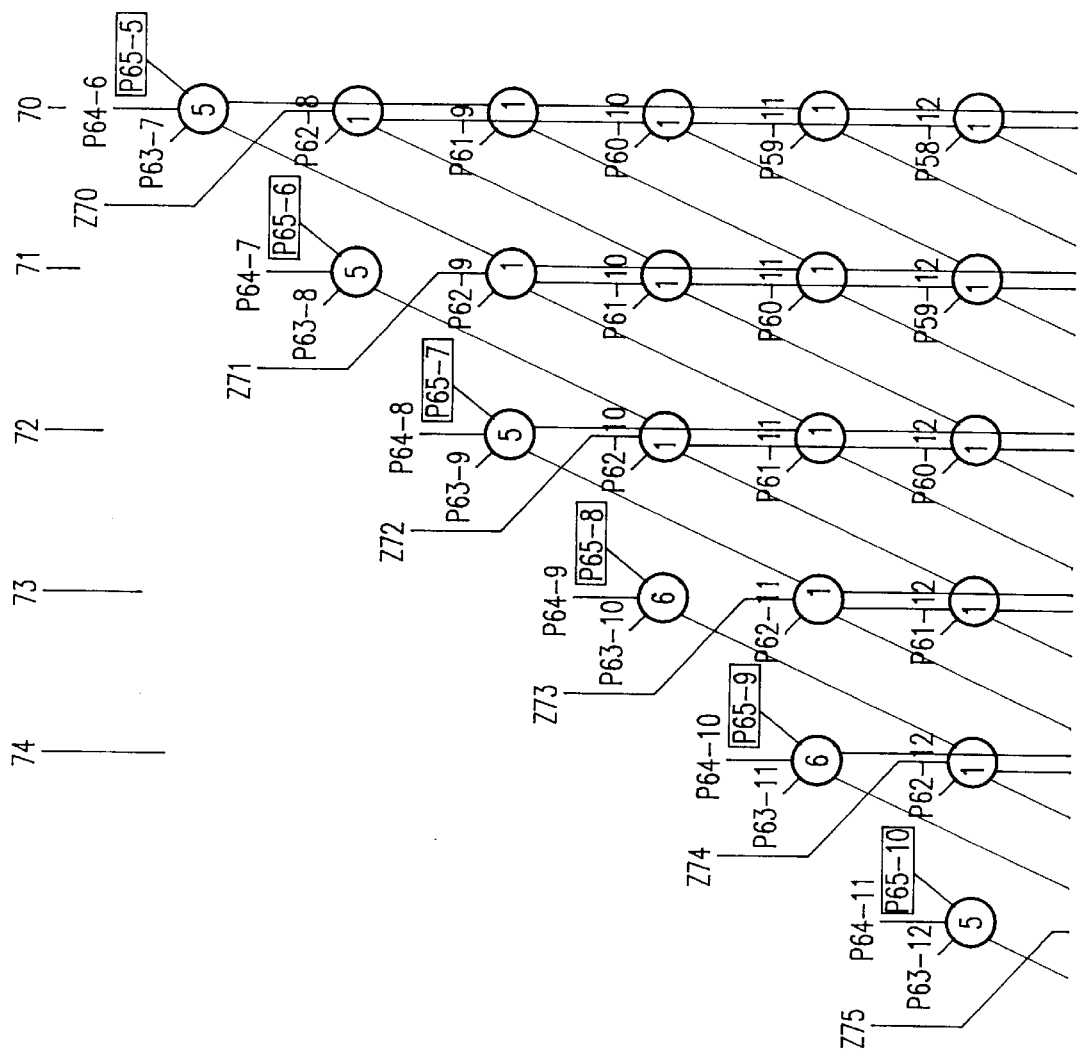
Figure 2E:
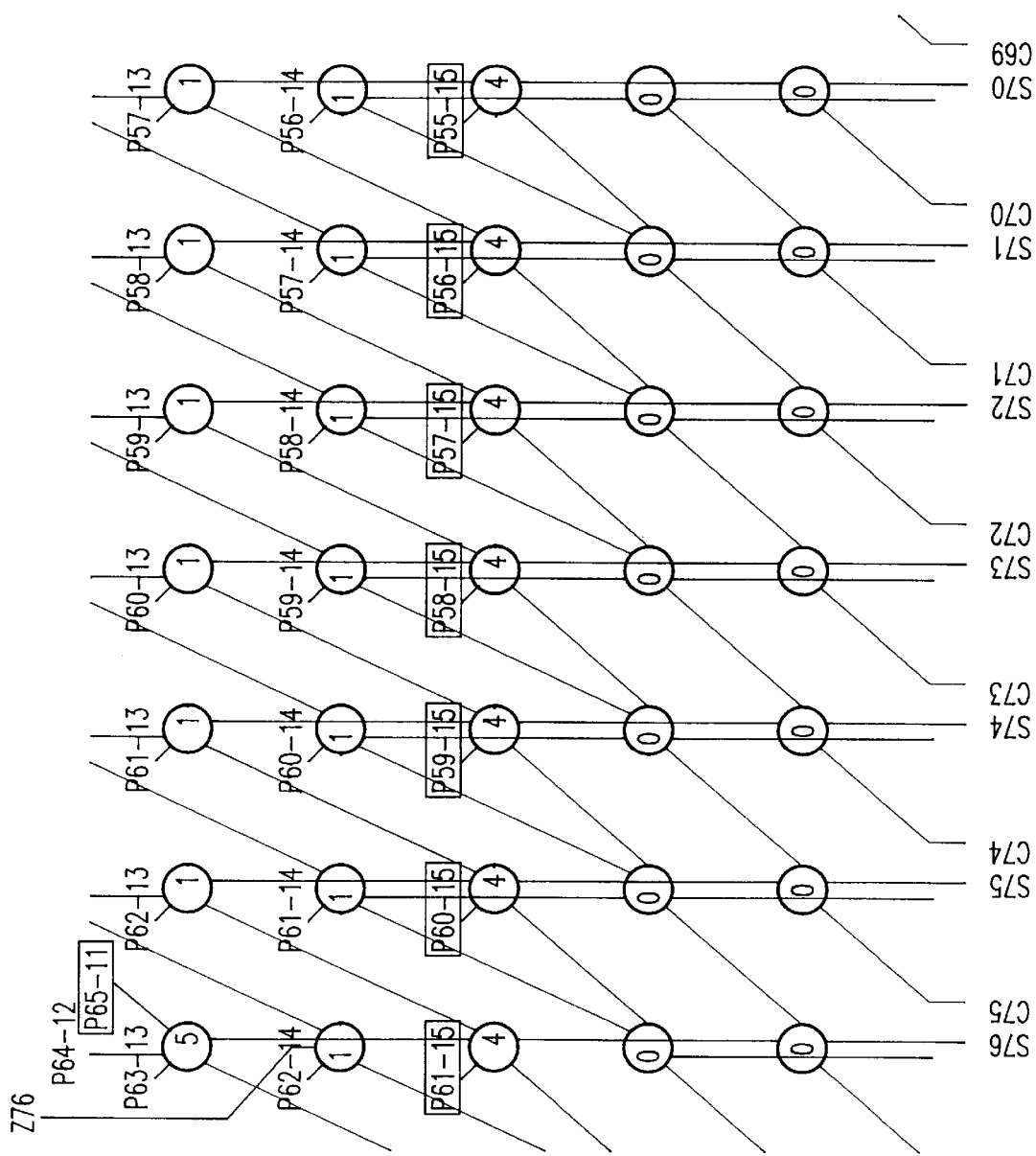
Figure 2F:
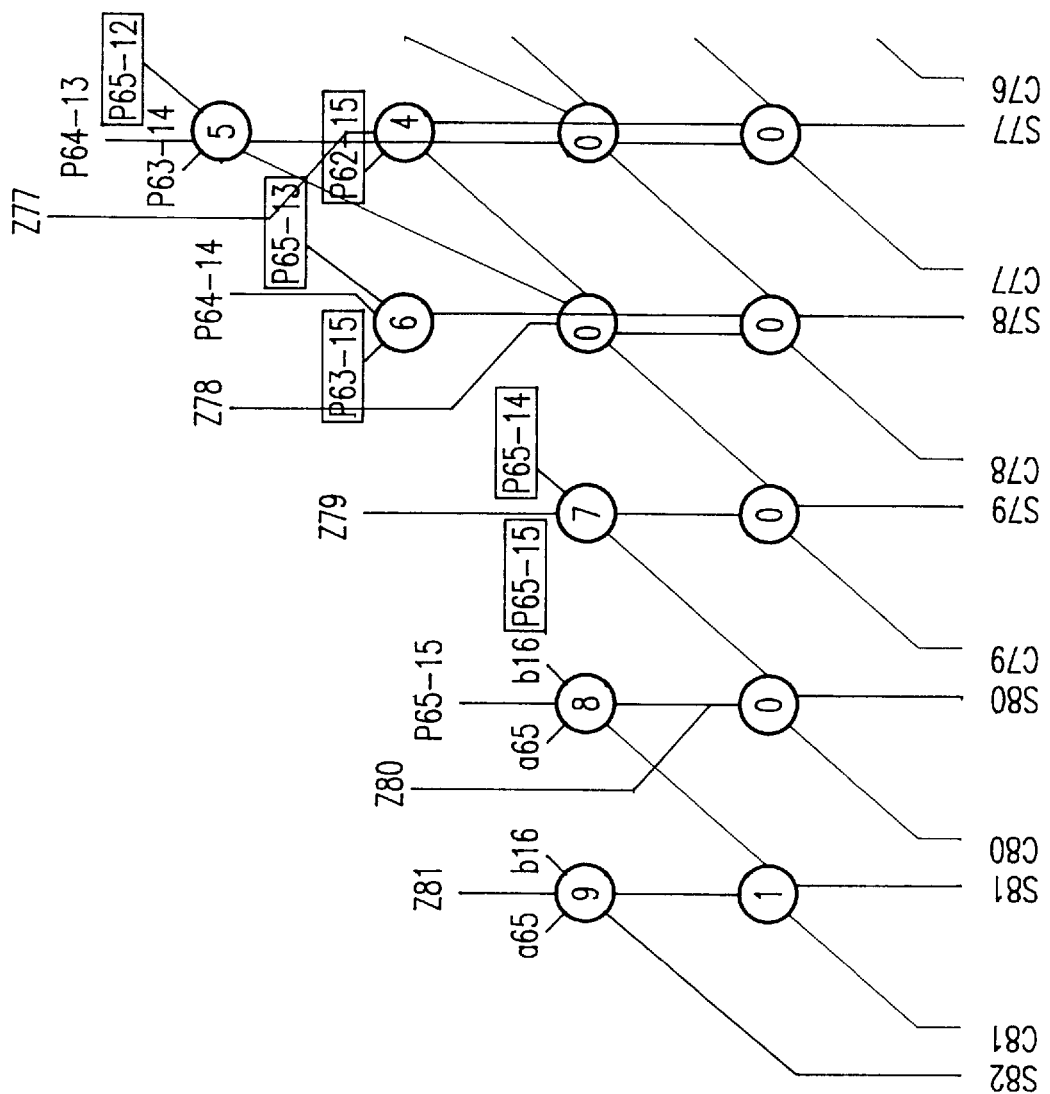
Figure 3B:
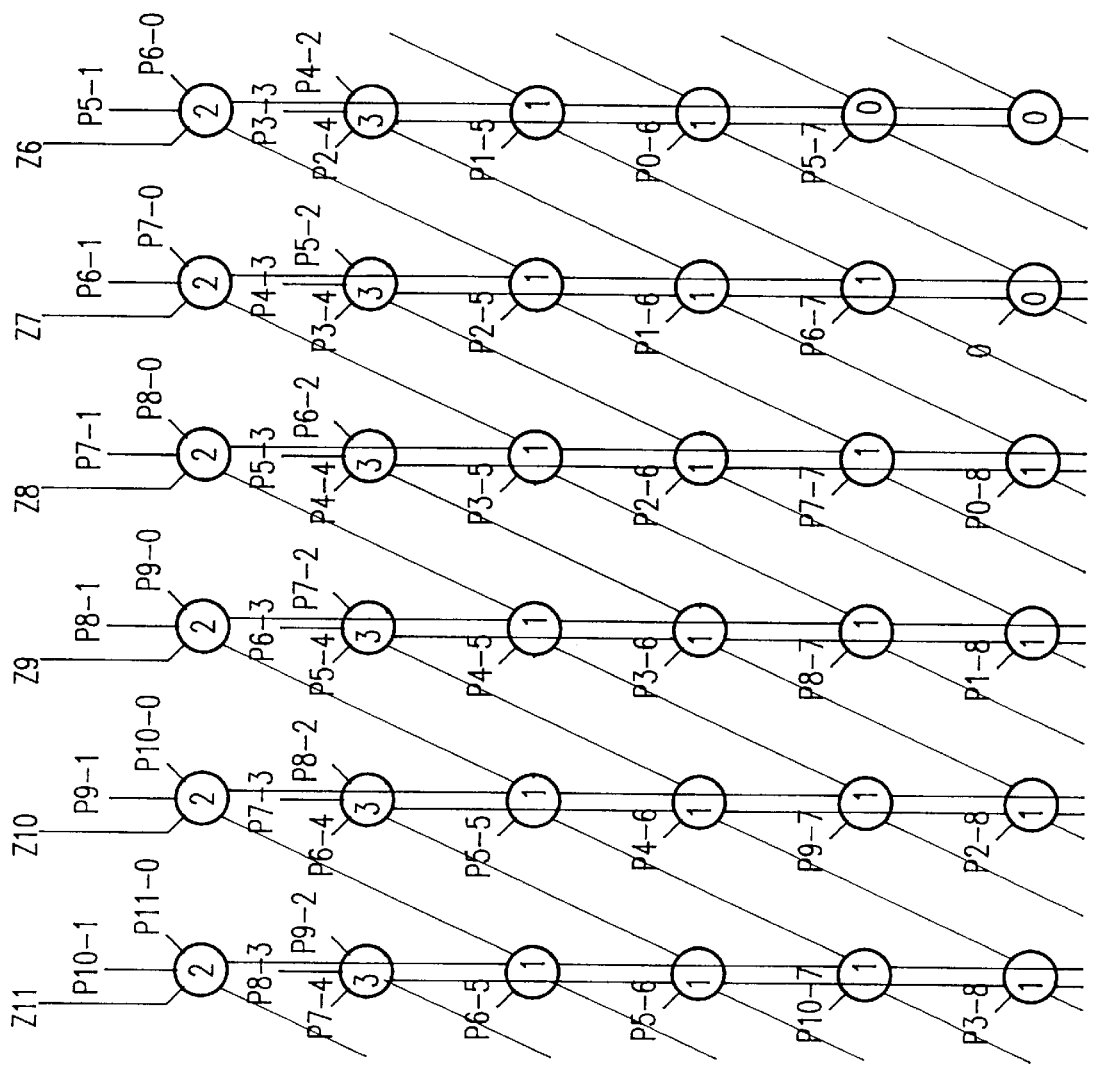
Figure 3C:
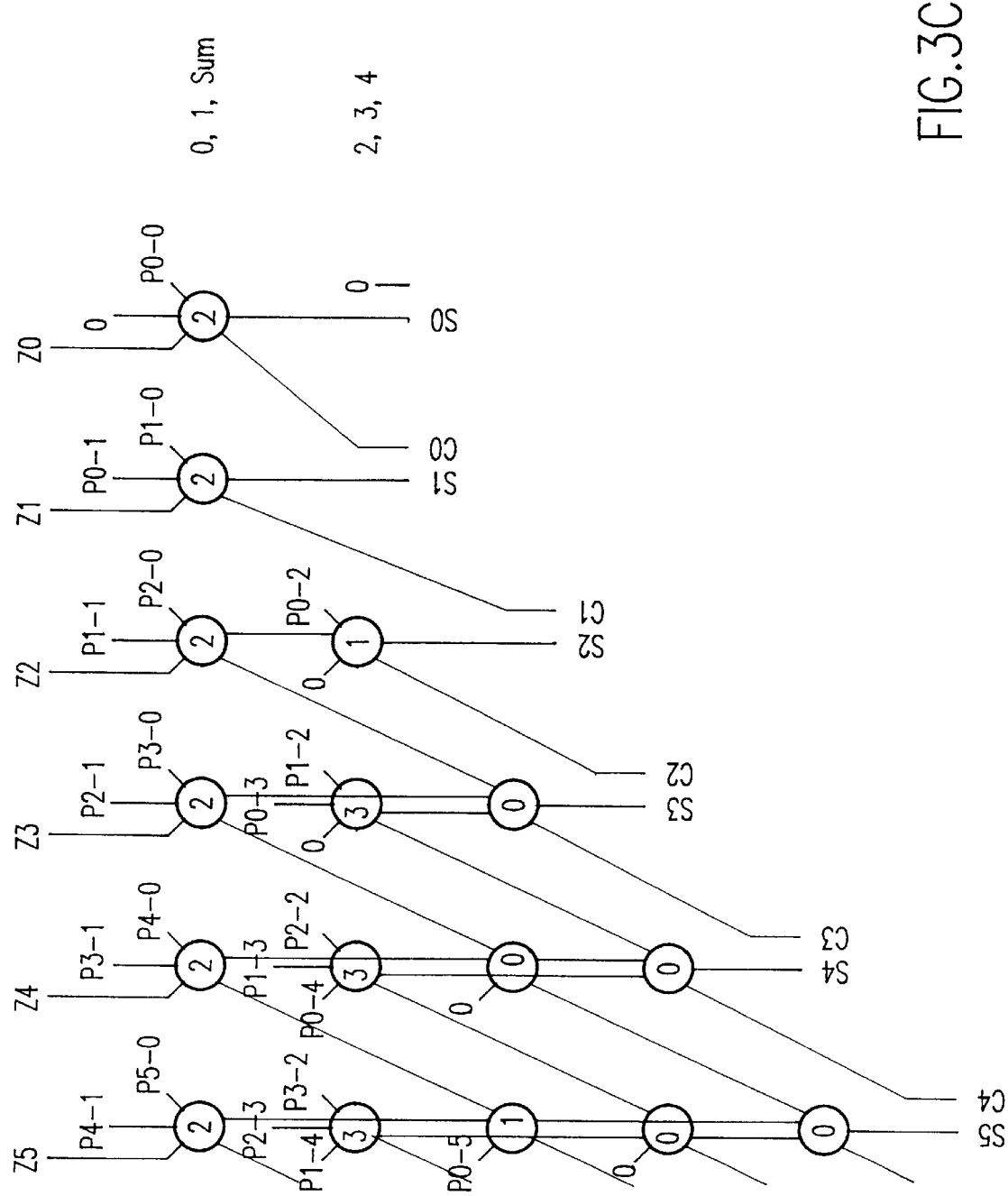
Figure 3D:
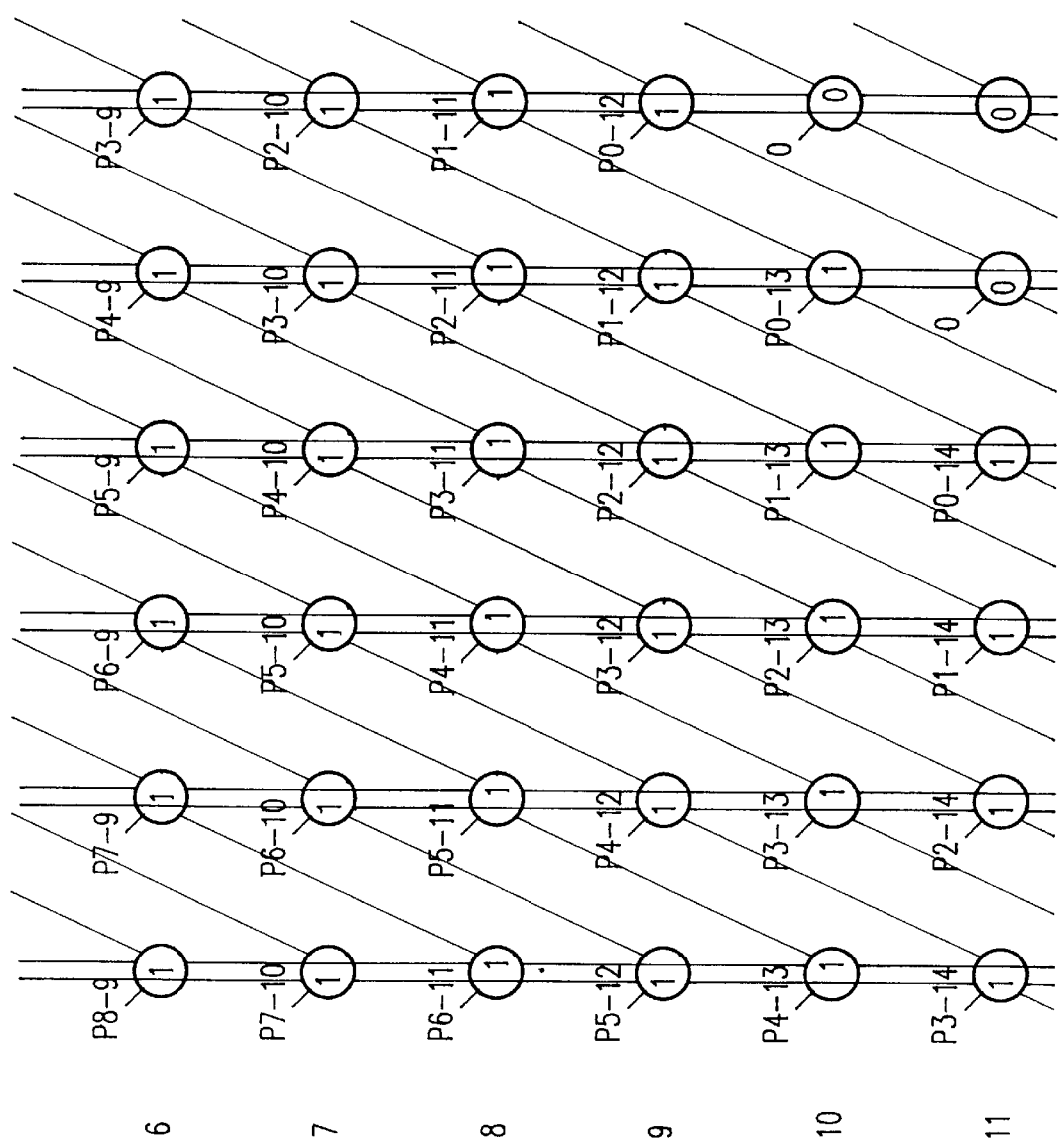
Figure 3E:
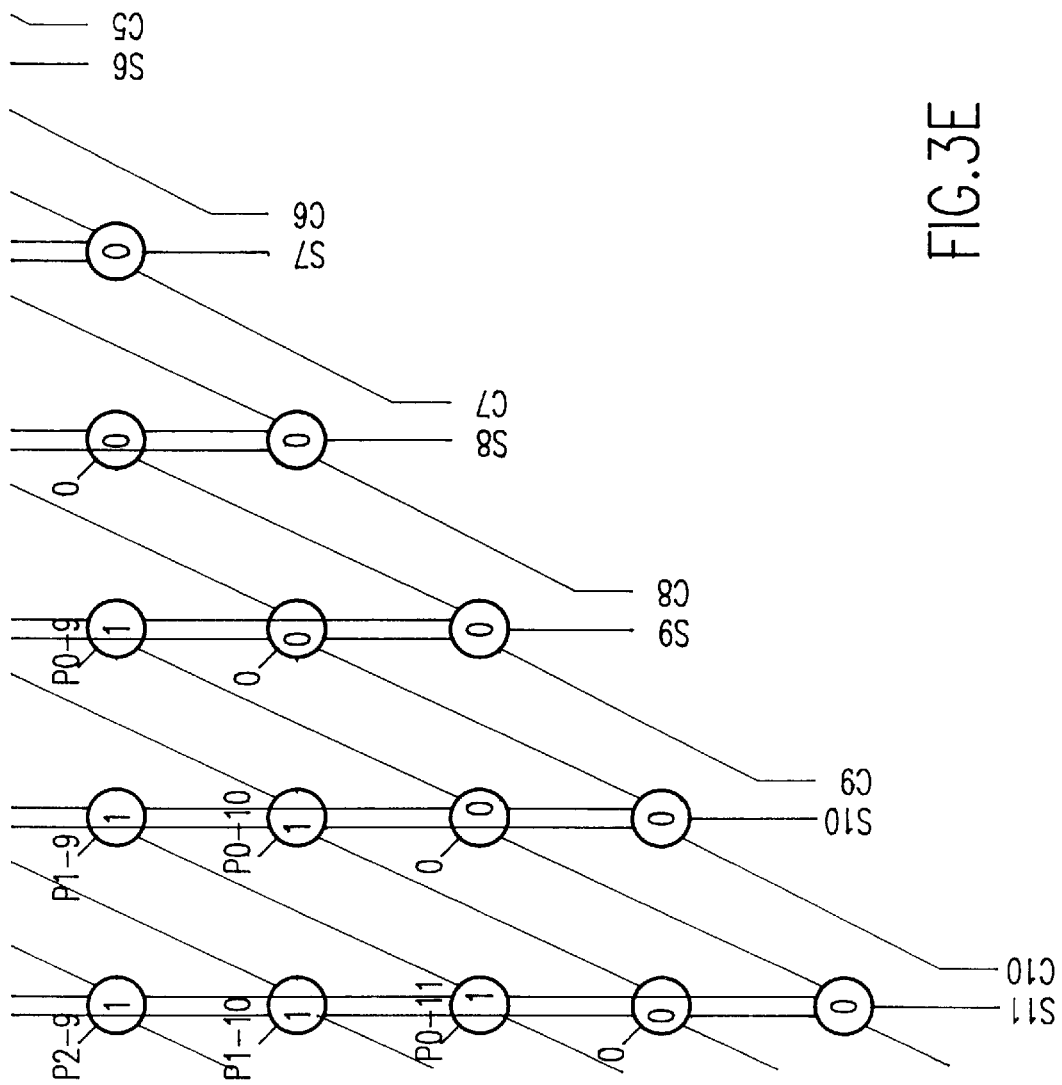
Figure 3F:
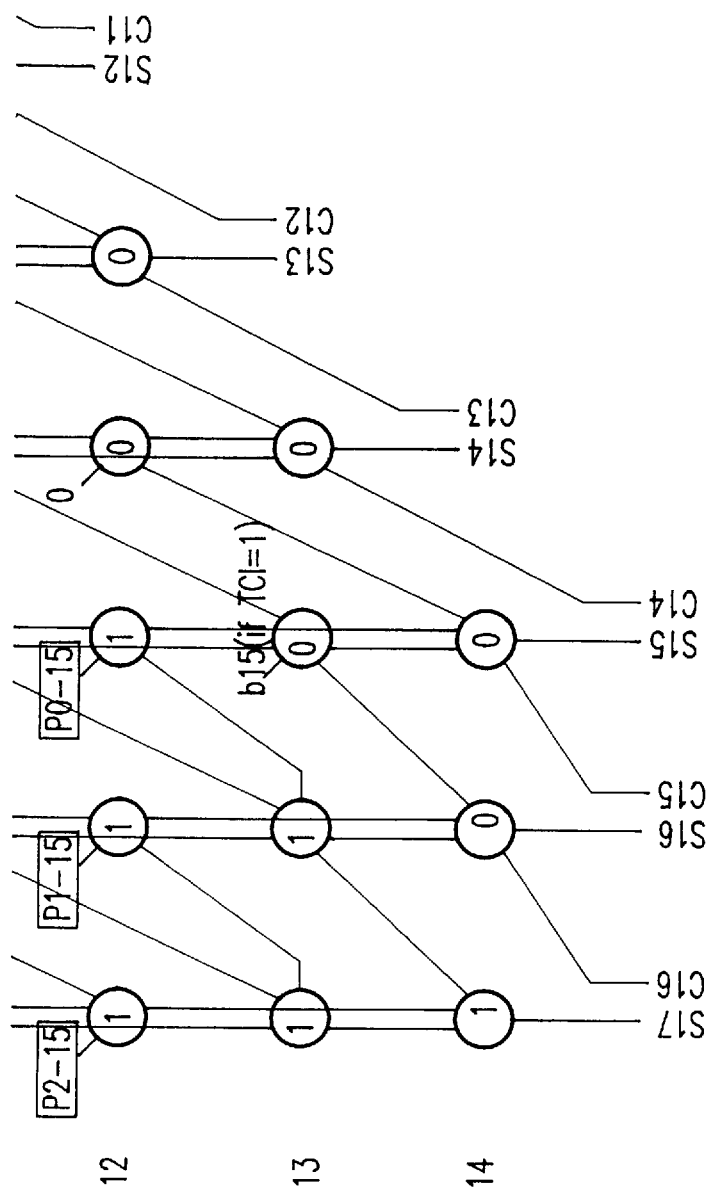

Referring now to the drawings, and more particularly to FIG. 1, there is shown a block diagram of the improved apparatus for performing a two's complement or unsigned multiplication and accumulation. The "a" input multiplicand is indicated as $a_{65}$-$a_0$, the "b" input multiplier is indicated as $b_{15}$-$b_0$, $b_{31}$-$b_{16}$, $b_{47}$-$b_{32}$, and $b_{63}$-$b_{48}$, and the "z" accumulator input is given as $z_{65}$-$z_0$, $z_{80}$-$z_{66}$, $z_{96}$-$z_{81}$, and $z_{97}$-$z_{112}$, and $z_{129}$-$z_{113}$. The result of the product of "a" times "b" and accumulation of "z" is labeled as $s_{130}$-$s_0$. The two's complement and unsigned integer multiply/accumulator comprises four identical multiplier panels 11, 12, 13, and 14, denoted respectively as multiplier panels A, B, C, and D. The first panel 11 receives sixteen multiplicand inputs $a_{15}$-$a_0$ and sixteen multiplier inputs $b_{15}$-$b_0$. The second panel 12 receives sixteen multiplicand inputs $a_{31}$-$a_{16}$ and sixteen multiplier inputs $b_{31}$-$b_{16}$. The third panel 13 receives sixteen multiplicand inputs $a_{47}$-$a_{32}$ and sixteen multiplier inputs $b_{47}$-$b_{32}$. The fourth panel 14 receives sixteen multiplicand inputs $a_{63}$-$a_{48}$ and sixteen multiplier inputs $b_{63}$-$b_{48}$.

Interposed between panels 11 and 12 is an adder tree 15 which sums the outputs of these two panels. Interposed between panels 12 and 13 is an adder tree 16 which sums the outputs of panel 13 and adder tree 15. The output from the fourth panel 14 is summed with the output of adder tree 16 by a third adder tree 17. A final adder 18 sums the outputs of the first panel 11 and the three adder trees 15, 16 and 17. This, however, is but one of several arrangements of panels and adder trees, depending on the number of multiplier panels. For example, in the embodiment shown in FIG. 1, the first adder tree 15 could sum the outputs of panels 11 and 12, as shown, but the second adder tree 16 could sum the outputs of panels 13 and 14 and then the outputs of the first and second adder trees could sum the outputs of the first and second adder trees. This arrangement would be entirely equivalent to that illustrated in FIG. 1. The choice typically would be dictated by available silicon geometry, with the arrangement shown in FIG. 1 being preferred where there is a width constraint and the alternative arrangement being preferred where there is a height constraint.

Each panel 11, 12, 13, and 14 receives four control inputs respectively designated as TCA1–TCA4, TCB1–TCB4, TCC1–TCC4, and TCD1–TCD4 to control their modes of operation. These control inputs differ from those described in my prior U.S. Pat. No. 5,121,352 in the following respects. The control inputs in my prior patent are used to control the mode of the multiply-accumulator only for the operations of (1) two's complement x and y, (2) unsigned magnitude x and y, (3) mixed mode with x in two's complement and y in unsigned, and (4) mixed mode with y in two's complement and x in unsigned. In this invention, the control inputs TC1, TC2, TC3, and TC4 for each panel are collectively used to control both mode control, in this case both operands in two's complement or both operands in unsigned, and very importantly panel position as it applies to the overall multiply accumulate implementation. By way of example, a four way split array for 64×66 multiply and 130 bit accumulator two's complement operation is as follows:

| TC1 | TC2 | TC3 | TC4 | Array | Product + Accumulator |
|---|---|---|---|---|---|
| 0 | 1 | 1 | 1 | 0 | b15=0 (b15-b00)×(a65-a00) + (0,z80-z00) |
| 0 | 1 | 0 | 1 | 1 | b=30 (b29-b15)×(a65-a00) + (0,z96-z81) |
| 0 | 1 | 0 | 1 | 2 | b46=0 (b45-b30)×(a65-a00) + (0,z112-z97) |
| 1 | 1 | 0 | 0 | 3 | (b63-b48)×(a65-a00 + (z129, z128-z113) |

And a four way split array for 64×66 unsigned magnitude operation is as follows:

| TC1 | TC2 | TC3 | TC4 | Array | Product + Accumulator |
|---|---|---|---|---|---|
| 0 | 0 | 0 | 0 | 1 | b15=0 (b15-b00)×(a65-a00) + (0,z80-z00) |
| 0 | 0 | 0 | 0 | 2 | b30=0 (b31-b16)×(a65-a00) + (0,z96-z81) |

-continued

| TC1 | TC2 | TC3 | TC4 | Array | Product + Accumulator |
|---|---|---|---|---|---|
| 0 | 0 | 0 | 0 | 3 | b46=0 (b47-b32)×(a65-a00) + (0,z112-z97) |
| 0 | 0 | 0 | 0 | 4 | (b63-b48)×(a65-a00) + (z129,z128-z113) |

It would not be possible to construct a partitioned multiply accumulate array with one unique panel were it not for the control bits acting to enable the proper panel behavior for panel position combined with multiplier mode. The alternative would be to construct four unique panels to implement the 64×66 array example above.

Figure 21:
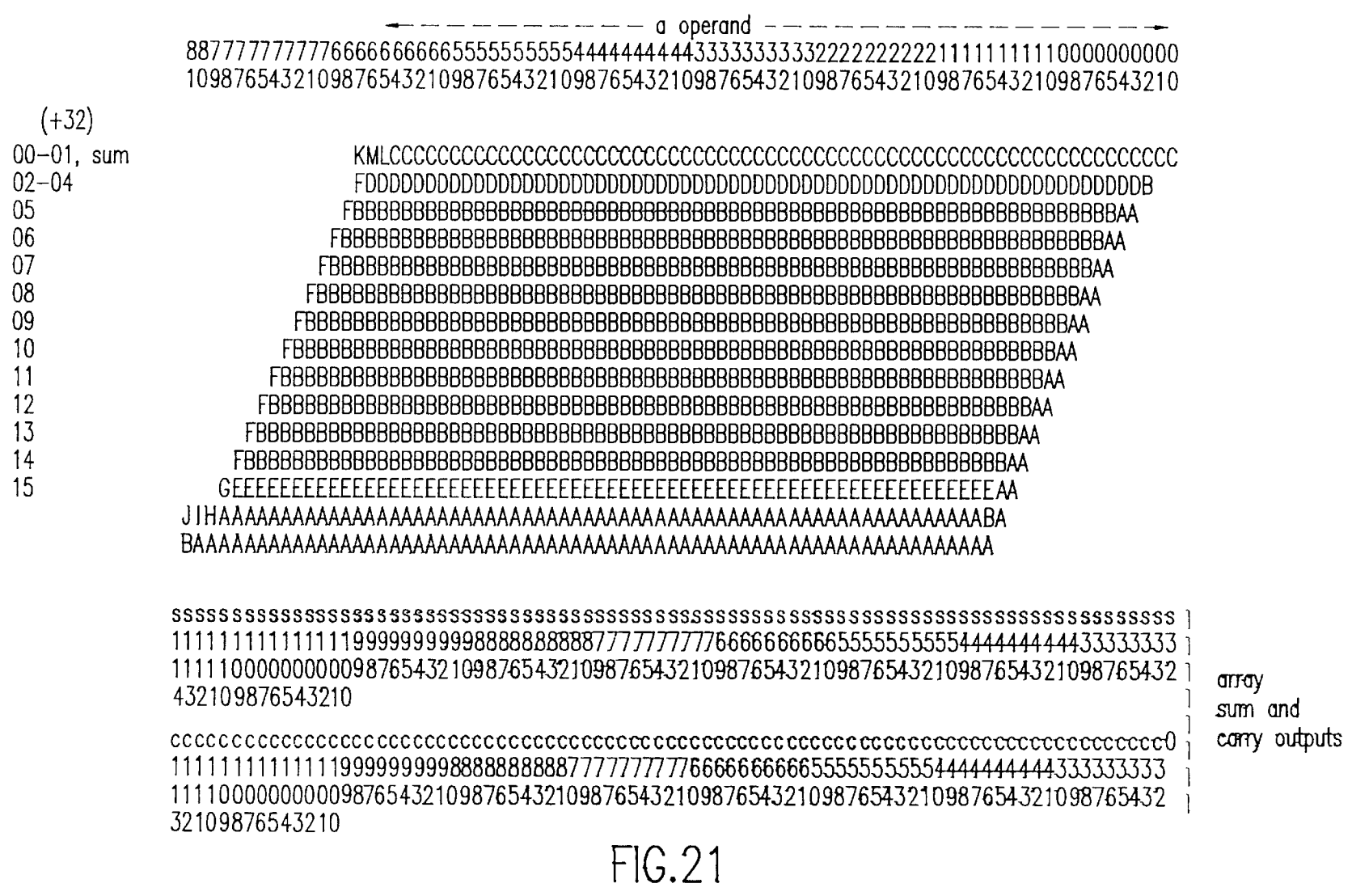

FIGS. 2 and 3 respectively illustrate the left hand side and the right hand side array interconnection and module composition of a 16×66 panel implementation of the improved panel design. Each row is formed from a set of modules, each of which are described in detail below. For the sake of simplifying the drawing figures, only the true inputs and outputs of the modules are illustrated, but it will be understood that both true and complement inputs and outputs are required for each of the modules. Even and odd rows are summed in parallel. The actual physical design of the panel (as shown in FIG. 21) is rectilinear versus the parallelogram structure depicted in FIGS. 2 and 3. Thirteen unique full adder modules, indicated via a number of 0 to 12, are used in the formation of a panel. The thirteen modules are identified by number, as shown in FIGS. 2 and 3, by module alphanumeric, and by figure number in the following Table 1:

TABLE 1

| Number | Module | FIG. |
|---|---|---|
| 0 | FAPRIM | 4 |
| 1 | FA1A | 7 |
| 2 | FA2A | 8 |
| 3 | FA3A | 9 |
| 4 | FAC1 | 10 |
| 5 | FBC1 | 11 |
| 6 | FABC1 | 12 |
| 7 | FABC2 | 13 |
| 8 | FAC2 | 14 |
| 9 | FAC3 | 15 |
| 10 | HAC2 | 16 |
| 11 | FBC2 | 17 |
| 12 | FBC3 | 18 |

Figure 4:
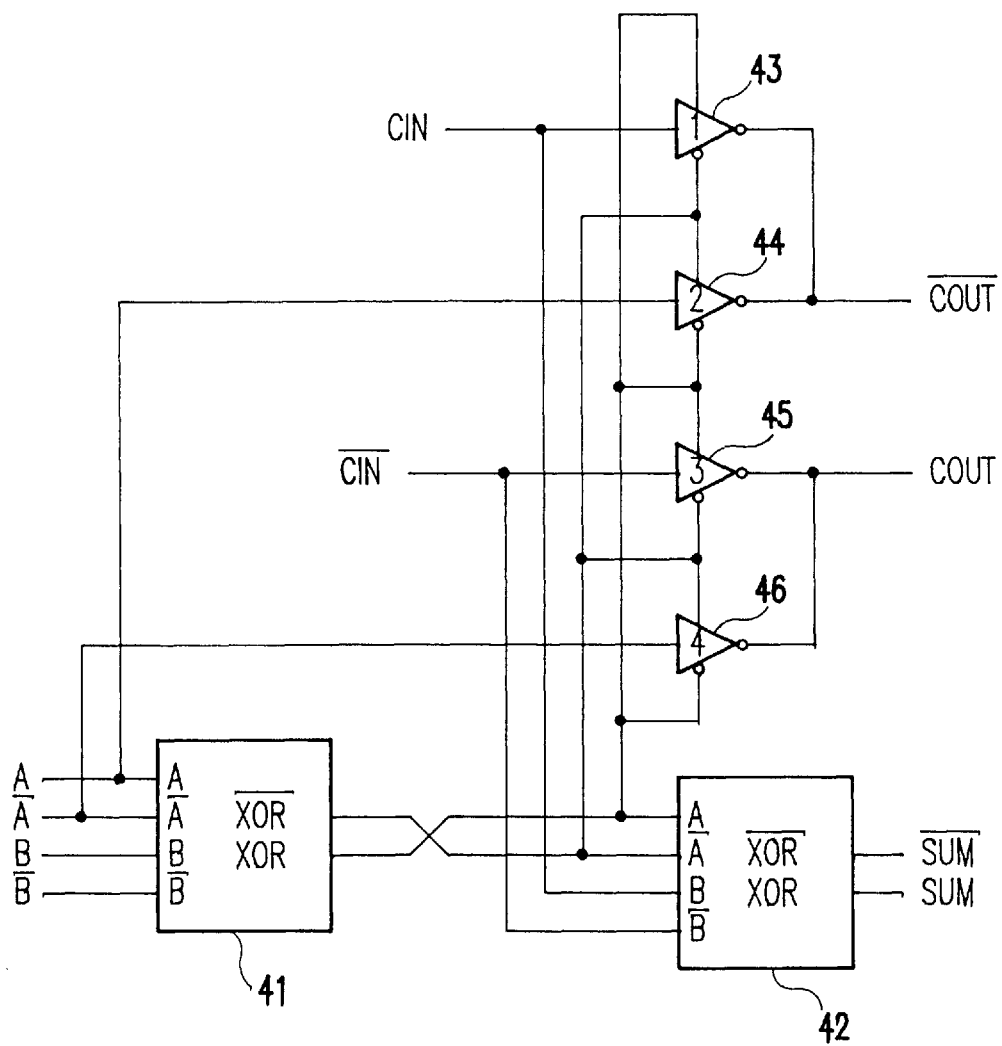
FIG. 4 is a block and logic diagram of the primary full adder (FAPRIM) used in the various multiplier modules which comprises the multiplier array panels.
Figure 7:
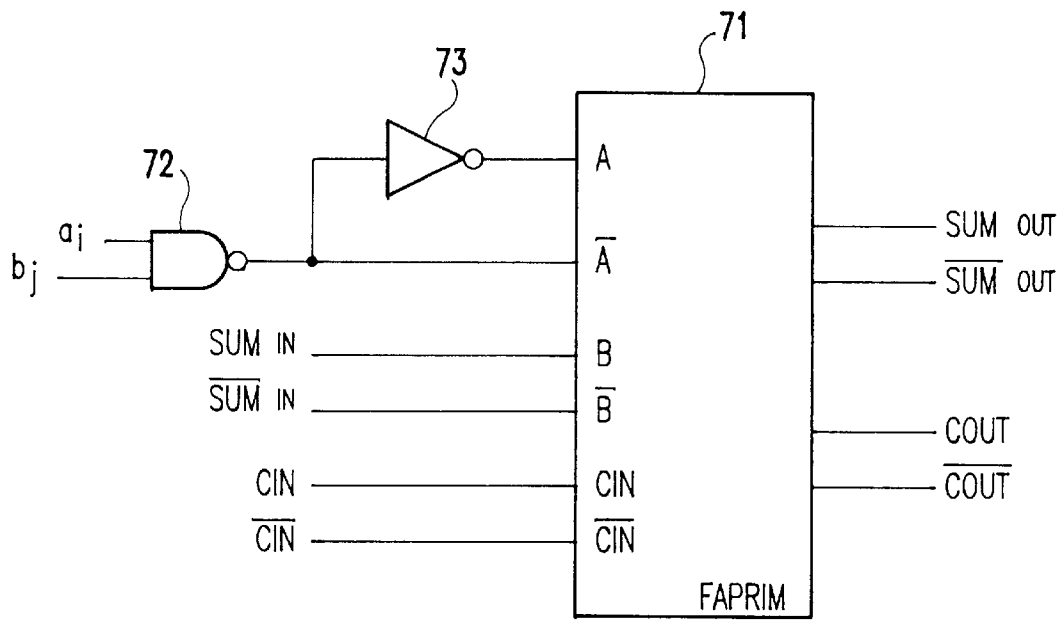
FIG. 7 is a block and logic diagram of the FA1A module.

The basic module (number 0 in FIGS. 2 and 3), from which all other modules are built, is the primary full adder, FAPRIM, shown in FIG. 4, with the core of the array built from the module FA1A (number 1 in FIGS. 2 and 3), shown in FIG. 7. All array modules that differ from the core array module FA1A are contained on the periphery of the panel and thus have at least one dimension to use for expansion if necessary. This makes for a dense memory-like structure of the multiply accumulate array panel.

The primary full adder, FAPRIM, as shown in FIG. 4 comprises two Exclusive OR (XOR) circuits 41 and 42 and four tri-invertor buffer circuits 43, 44, 45, and 46. The basic tri-inverter buffer circuit is shown in FIG. 5 as composed of a pair of n-channel FETs 51 and 52 and a pair of p-channel FETs 53 and 54. The gates of each of FETs 51 and 54 are connected in common to a common input terminal 55. The gate of FET 53 is connected to a first select control terminal which receives an inhibit signal en, while the gate of FET 53 is connected a second select control terminal which receives the complement of signal en, here shown as enb. The source of FET 51 is connected to a source of voltage at terminal 56, while the source of FET 54 is connected to a voltage reference, such as circuit ground, at terminal 57. The common connection of the sources of FETs 52 and 53 provides the output 58 of the tri-inverter circuit. The symbol for the tri-inverter circuit is shown in FIG. 5A. Two of the tri-inverter circuits, 61 and 62, comprise a logic unit as shown in FIG. 6, having the following truth table:

| in1 | in0 | sel0 | sel0f | outf | |
|---|---|---|---|---|---|
| x | 0 | 1 | 0 | 1 | } pass complement of in0 |
| x | 1 | 1 | 0 | 0 | |
| 0 | x | 0 | 1 | 1 | } pass complement of in1 |
| 0 | x | 0 | 1 | 0 | | where x=don't care. When the input in1 is A, the input in0 is $\overline{A}$, the first select sel0 is $\overline{B}$, and the second select sel0f is B, the logic function of the unit shown in FIG. 6 is that of Exclusive OR (XOR). By interchanging the inputs A and $\overline{A}$, the logic function of the unit is the inverse, or $\overline{XOR}$. Looking at the circuit in FIG. 6 another way, the circuit operates as a multiplexer in which the selection signal sel0 and its complement sel0f serve to select either in1 or in0 as the output outf; that is, the complement of the selected input signal.

Returning to FIG. 4, the first XOR circuit 41, which contains two of the logic units shown in FIG. 6, receives inputs A, $\overline{A}$, B, and $\overline{B}$ outputs $A \cdot \overline{B} + \overline{A} \cdot B$ (i.e., XOR) and $A \cdot B + \overline{A} \cdot \overline{B}$ (i.e., $\overline{XOR}$). The second XOR circuit 42, identical to the first, receives at its A input the XOR output of the first XOR circuit 41, and at its $\overline{A}$ input, the $\overline{XOR}$ output of the first XOR circuit 41. The B input of XOR circuit 42 receives as its input CIN, and the $\overline{B}$ input receives as its input $\overline{CIN}$. The XOR output of XOR circuit 42 is the SUM output of the full adder, and the $\overline{XOR}$ output of XOR circuit 42 is the $\overline{SUM}$ output of the full adder. Tri-inverter buffer circuit 43 also receives input CIN, and has its first select control terminal connected to the XOR output of the first XOR circuit 41 and its second select control terminal connected to the $\overline{XOR}$ output of XOR circuit 41. Tri-inverter buffer circuit 44 also receives input A, and has its first select control terminal connected in common with the second control terminal of tri-inverter buffer circuit 43 and its second select control terminal connected in common with the first select control terminal of tri-inverter buffer circuit 43. Tri-inverter buffer circuit 45 also receives input $\overline{CIN}$, and has its first select control terminal connected to the XOR output of the first XOR circuit 41 and its second select control terminal connected to the $\overline{XOR}$ output of XOR circuit 41. Tri-inverter buffer circuit 46 also receives input $\overline{A}$, and has its first select control terminal connected in common with the second control terminal of tri-inverter buffer circuit 45 and its second select control terminal connected in common with the first select control terminal of tri-inverter buffer circuit 45. The outputs of tri-inverter buffer circuits 43 and 44 are connected in common to provide the output $\overline{COUT}$. The outputs of tri-inverter buffers 45 and 46 are connected in common to provide the output COUT. The truth table for the primary full adder, FAPRIM, is as follows:

| a | b | cin | sum | cout |
|---|---|-----|-----|------|
| 0 | 0 | 0   | 0   | 0    |
| 0 | 0 | 1   | 1   | 0    |
| 0 | 1 | 0   | 1   | 0    |
| 0 | 1 | 1   | 0   | 1    |
| 1 | 0 | 0   | 1   | 0    |
| 1 | 0 | 1   | 0   | 1    |
| 1 | 1 | 0   | 0   | 1    |
| 1 | 1 | 1   | 1   | 1    |

The core array module, FA1A, is shown in FIG. 7 and comprises a primary full adder, FAPRIM, 71 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by a NAND gate 72 receiving as its inputs $a_i$ and $b_j$ and inverter 73, where $a_i$ and $b_j$ correspond to the ith multiplicand and jth multiplier bits, respectively. The inverted logical product of $a_i$ and $b_j$ from NAND gate 72 is the input $\overline{A}$, and the logical product output from inverter 73 is the input A. The inputs B and $\overline{B}$ are supplied respectively by $SUM_{in}$ and $\overline{SUM}_{in}$, generated as $SUM_{out}$ and $\overline{SUM}_{out}$ from a preceding module, while the inputs CIN and $\overline{CIN}$ are supplied respectively by CIN and $\overline{CIN}$, generated as COUT and $\overline{COUT}$ from a preceding module.

Figure 8:
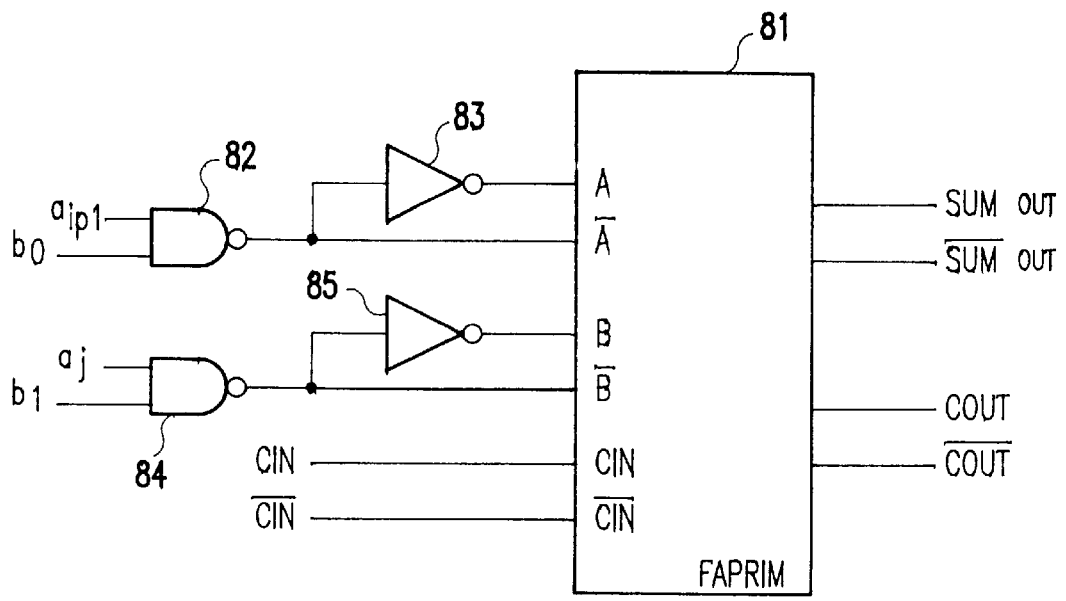
FIG. 8 is a block and logic diagram of the FA2A module.

The number 2 module, FA2A, from Table 1 is shown in FIG. 8 and comprises a primary full adder, FAPRIM, 81 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by a NAND gate 82 receiving as its inputs $a_{jp1}$ and $b_0$ and inverter 83. The inverted logical product of $a_{jp1}$ and $b_0$ from NAND gate 82 is the input $\overline{A}$, and the logical product output from inverter 83 is the input A. The inputs B and $\overline{B}$ are generated by NAND gate 84 receiving as its inputs $a_j$ and $b_1$ and inverter 85, while the inputs CIN and $\overline{CIN}$ are supplied respectively by CIN and $\overline{CIN}$, generated as COUT and $\overline{COUT}$ from a preceding module.

Figure 9:
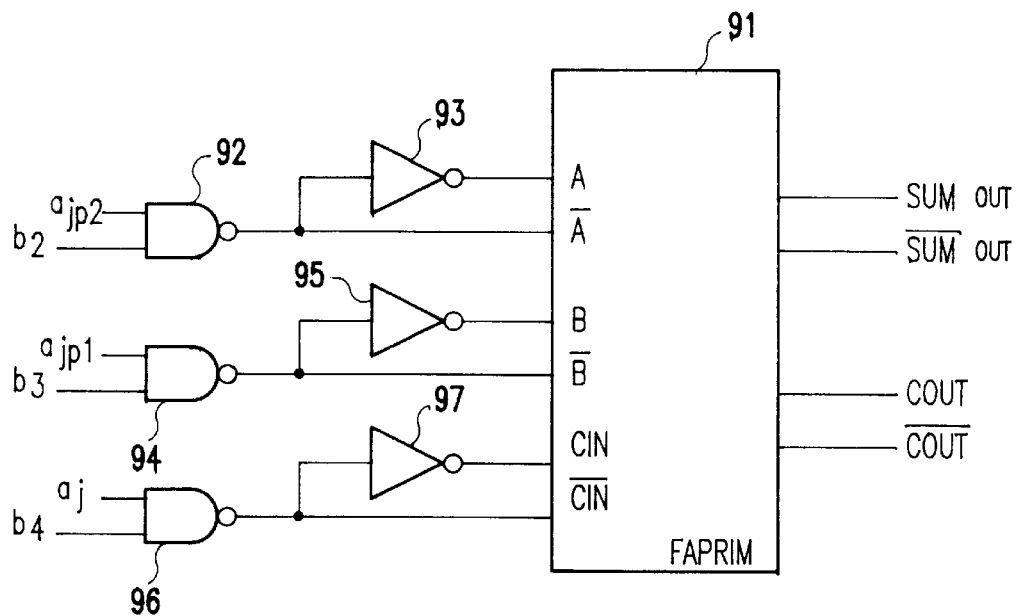
FIG. 9 is a block and logic diagram of the FA3A module.

The number 3 module, FA3A, from Table 1 is shown in FIG. 9 and comprises a primary full adder, FAPRIM, 91 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by a NAND gate 92 receiving as its inputs $a_{jp2}$ and $b_2$ and inverter 93. The inverted logical product of $a_{jp2}$ and $b_2$ from NAND gate 92 is the input $\overline{A}$, and the logical product output from inverter 93 is the input A. The inputs B and $\overline{B}$ are generated by NAND gate 94 receiving as its inputs $a_{jp1}$ and $b_3$ and inverter 95, while the inputs CIN and $\overline{CIN}$ are generated by NAND gate 96 receiving as its inputs $a_j$ and $b_4$ and inverter 97.

Figure 10:
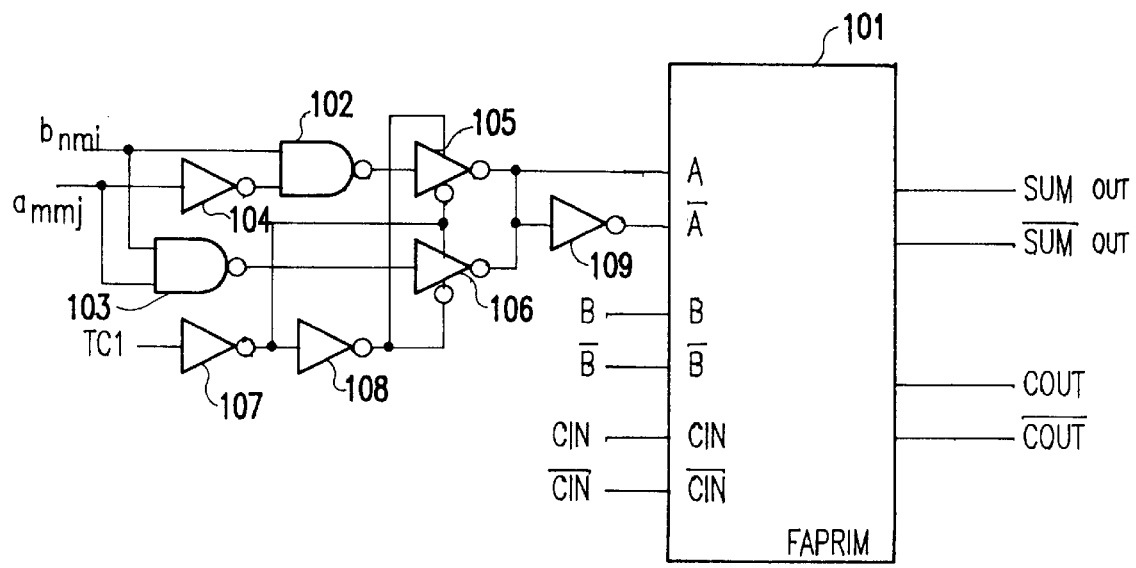
FIG. 10 is a block and logic diagram of the FAC1 module.

The number 4 module, FAC1, from Table 1 is shown in FIG. 10 and comprises a primary full adder, FAPRIM, 101 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by either of NAND gates 102 or 103, both of which receive as one input $b_{nmi}$. NAND gate 103 receives as its second input $a_{nmj}$, and NAND gate 102 receives as its second input the inverse of $a_{nmj}$ from inverter 104. The outputs of NAND gates 102 and 103 are respectively input to tri-inverter buffer circuits 105 and 106 which, in this application, function as a multiplexer passing either the output of NAND gate 102 or the output of NAND gate 103. The selection signal for the multiplexer is the control signal TC1 which is input to cascade inverters 107 and 108. The output of inverter 107 is input as selection signal sel0f in FIG. 6, while the output of inverter 108 is input as selection signal sel0 in FIG. 6. The input A to FAPRIM 101 is directly from the outputs of tri-inverter buffers 105 and 106, and the input $\overline{A}$ is from inverter 109. The inputs B and $\overline{B}$ are supplied as B and $\overline{B}$, while the inputs CIN and $\overline{CIN}$ are supplied respectively by CIN and $\overline{CIN}$, generated as COUT and $\overline{COUT}$ from a preceding module. In the FAC1 module, $$\text{THEN mux out} = \overline{a}_{mmj} \cdot b_{nmi}$$

$$\text{ELSE mux out} = a_{mmj} \cdot b_{nmi}$$

Figure 11:
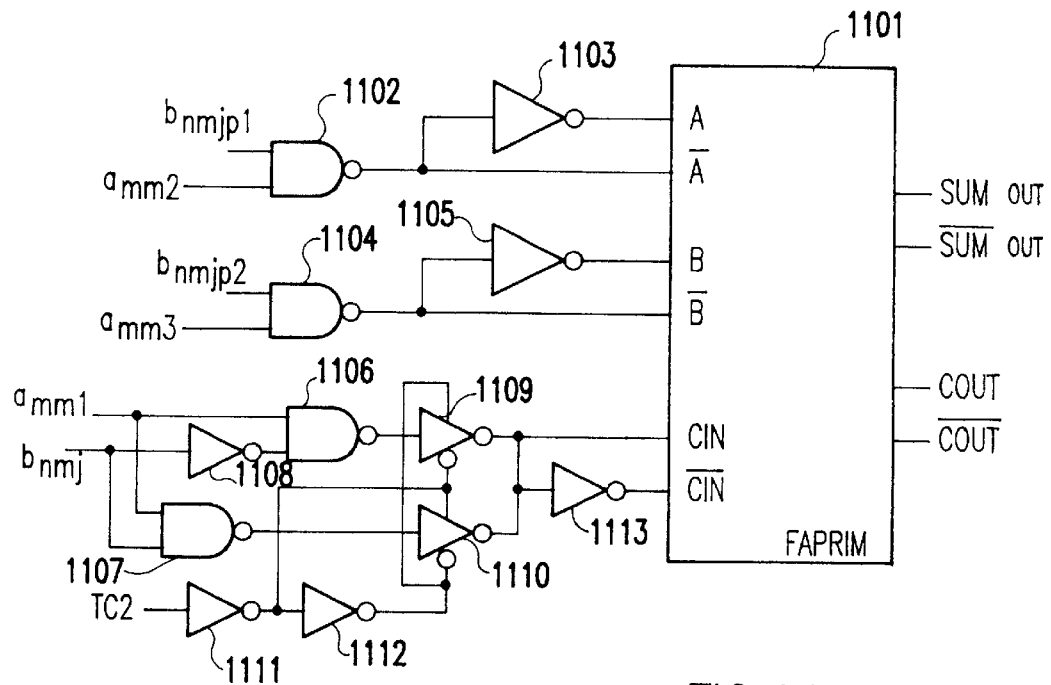
FIG. 11 is a block and logic diagram of the FBC1 module.

The number 5 module, FBC1, from Table 1 is shown in FIG. 11 and comprises a primary full adder, FAPRIM, 1101 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by a NAND gate 1102 receiving as its inputs $a_{mm2}$ and $b_{nmjp1}$ and inverter 1103. The inverted logical product of $a_{mm2}$ and $b_{nmjp1}$ from NAND gate 1102 is the input $\overline{A}$, and the logical product output from inverter 1103 is the input A. The inputs B and $\overline{B}$ are generated by NAND gate 1104 receiving as its inputs $a_{mm3}$ and $b_{nmjp2}$ and inverter 1105. The CIN and $\overline{CIN}$ inputs are generated by either of NAND gates 1106 or 1107, both of which receive as one input $b_{nmj}$. NAND gate 1107 receives as its second input $a_{mm1}$, and NAND gate 1106 receives as its second input the inverse of $a_{mm1}$ from inverter 1108. The outputs of NAND gates 1106 and 1107 are respectively input to tri-inverter buffer circuits 1109 and 1110 which function as a multiplexer passing either the output of NAND gate 1106 or the output of NAND gate 1107. The selection signal for the multiplexer is the control signal TC2 which is input to cascade inverters 1111 and 1112. The output of inverter 1111 is input as selection signal sel0f in FIG. 6, while the output of inverter 1112 is input as selection signal sel0 in FIG. 6. The input CIN to FAPRIM 1101 is directly from the outputs of tri-inverter buffers 1109 and 1110, and the input $\overline{CIN}$ is from inverter 1113. In module FBC1, $$\text{IF TC2} = 1$$
$$\text{THEN mux out} = a{m_{m1}} \cdot \overline{b}_{nmj}$$
$$\text{ELSE mux out} = a_{mm1} \cdot b_{nmj}$$

Figure 12:
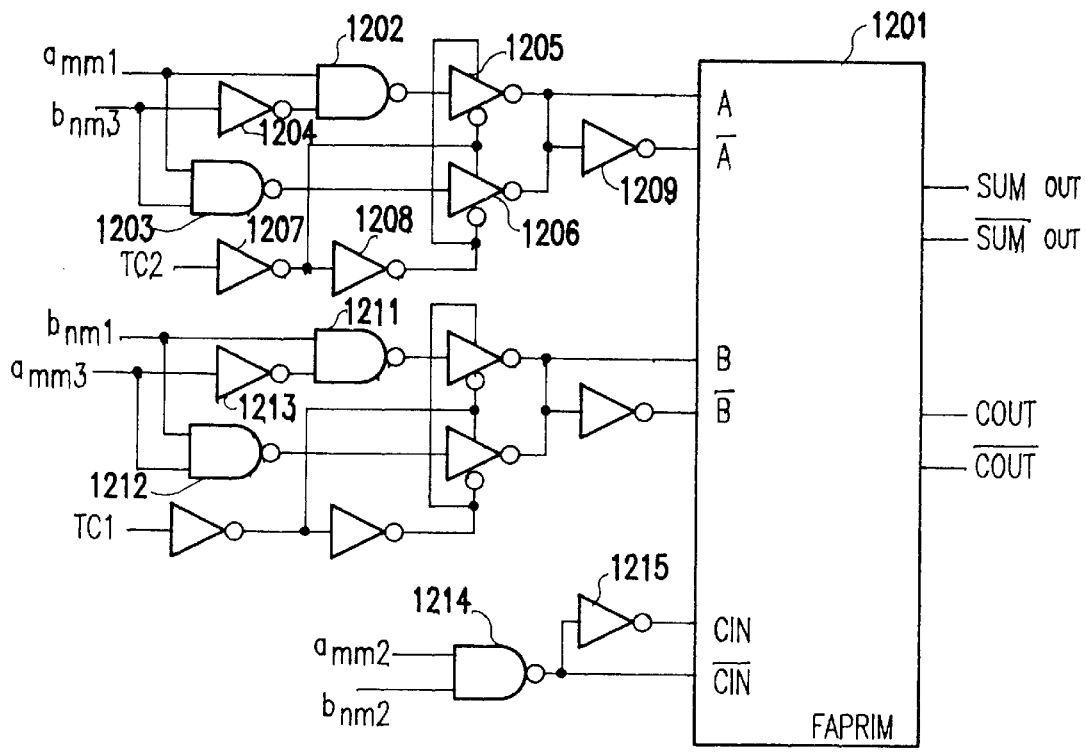
FIG. 12 is a block and logic diagram of the FABC1 module.
Figure 13:
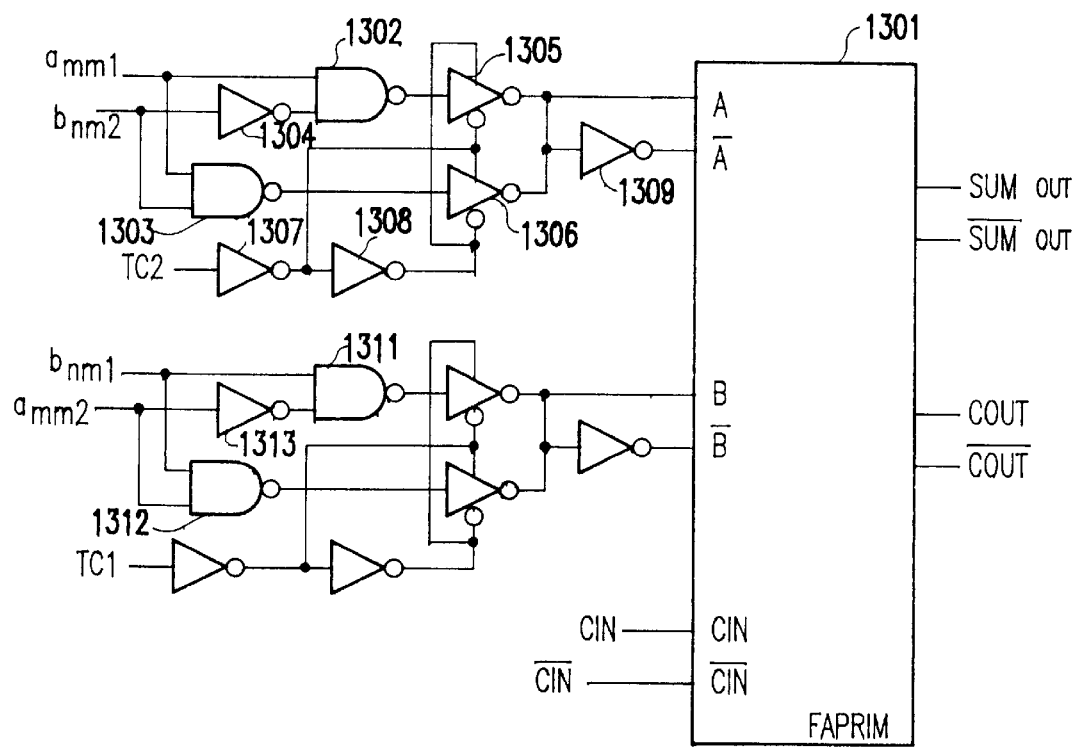
FIG. 13 is a block and logic diagram of the FABC2 module.
Figure 14:
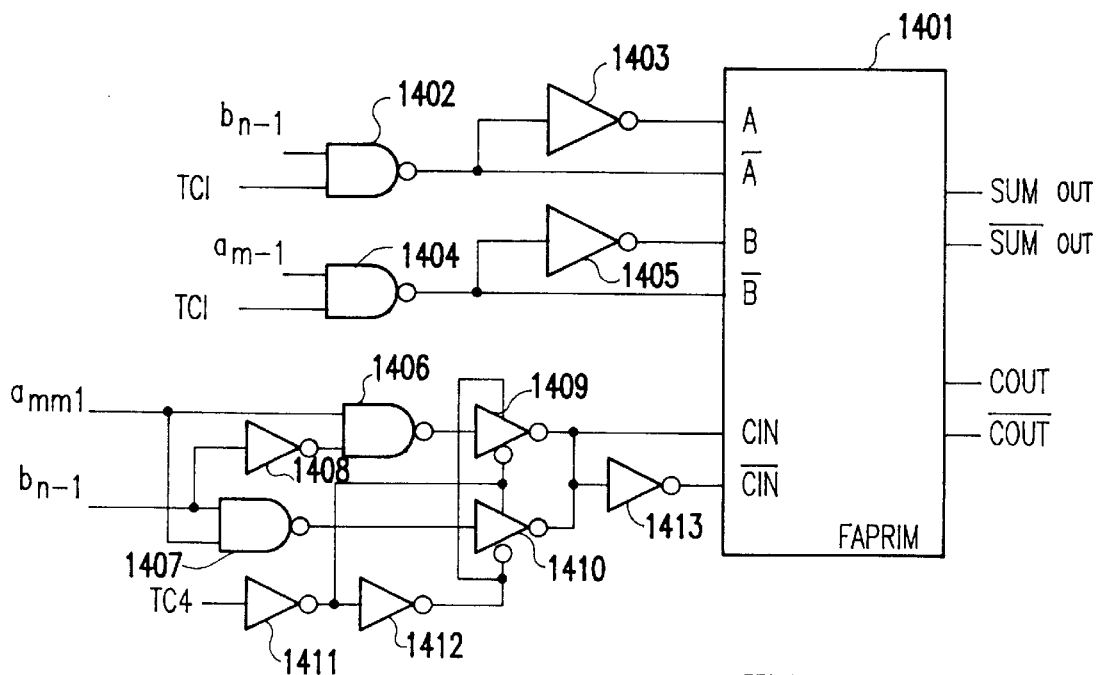
FIG. 14 is a block and logic diagram of the FAC2 module.
Figure 15:
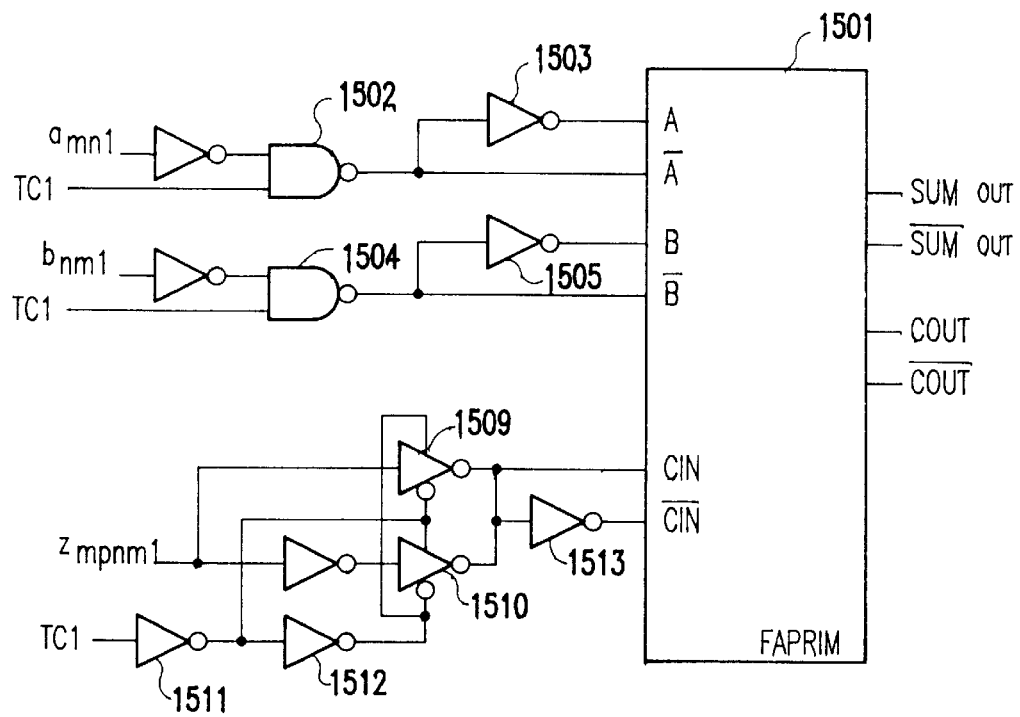
FIG. 15 is a block and logic diagram of the FAC3 module.

The number 6 module, FABC 1, from Table 1 is shown in FIG. 12 and comprises a primary full adder, FAPRIM, 1201 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by either of NAND gates 1202 or 1203, both of which receive as one input $a_{mm1}$. NAND gate 1203 receives as its second input $b_{nm3}$, and NAND gate 1202 receives as its second input the inverse of $b_{nm3}$ from inverter 1204. The outputs of NAND gates 1202 and 1203 are respectively input to tri-inverter buffer circuits 1205 and 1206 which function as a multiplexer passing either the output of NAND gate 1202 or the output of NAND gate 1203. The selection signal for the multiplexer is the control signal TC2 which is input to cascade inverters 1207 and 1208. The output of inverter 1207 is input as selection signal sel0f in FIG. 6, while the output of inverter 1208 is input as selection signal sel0 in FIG. 6. The input A to FAPRIM 101 is directly from the outputs of tri-inverter buffers 1205 and 1206, and the input $\overline{A}$ is from inverter 1209. The inputs B and $\overline{B}$ are generated similarly to A and $\overline{A}$ except that NAND gates 1211 and 1212 receive as an input $b_{nm1}$, NAND gate 1212 receives as its second input $a_{mm3}$, and NAND gate 1211 receives as its second input the inverse of $a_{mm3}$ from inverter 1213. The multiplexed outputs of NAND gates 1211 and 1212 are selected by control signal TC1. The inputs CIN and $\overline{CIN}$ are generated by NAND gate 1214 which receives as inputs $a_{mm2}$ and $b_{mm2}$ and inverter 1215. In module FABC1, IF TC2 = 1
    THEN $mux_A$ out = $a_{mm1} \cdot \overline{b}_{nm3}$
    ELSE $mux_A$ out = $a_{mm1} \cdot b_{nm3}$
IF TC1 = 1
    THEN $mux_B$ out = $\overline{a}_{mm3} \cdot b_{nm1}$
    ELSE $mux_B$ out = $a_{mm3} \cdot b_{nm1}$ The number 7 module, FABC2, from Table 1 is shown in FIG. 13 and comprises a primary full adder, FAPRIM, 1301 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by either of NAND gates 1302 or 1303, both of which receive as one input $a_{mm1}$. NAND gate 1303 receives as its second input $b_{nm2}$, and NAND gate 1302 receives as its second input the inverse of $b_{nm2}$ from inverter 1304. The outputs of NAND gates 1302 and 1303 are respectively input to tri-inverter buffer circuits 1305 and 1306 which function as a multiplexer passing either the output of NAND gate 1302 or the output of NAND gate 1303. The selection signal for the multiplexer is the control signal TC2 which is input to cascade inverters 1307 and 1308. The output of inverter 1307 is input as selection signal sel0f in FIG. 6, while the output of inverter 1308 is input as selection signal sel0 in FIG. 6. The input A to FAPRIM 101 is directly from the outputs of tri-inverter buffers 1305 and 1306, and the input $\overline{A}$ is from inverter 1309. The inputs B and $\overline{B}$ are generated similarly to A and $\overline{A}$ except that NAND gates 1311 and 1312 receive as an input $b_{nm1}$, NAND gate 1312 receives as its second input $a_{mm2}$, and NAND gate 1311 receives as its second input the inverse of $a_{mm2}$ from inverter 1313. The multiplexed outputs of NAND gates 1311 and 1312 are selected by control signal TC1. The inputs CIN and $\overline{CIN}$ are supplied respectively by CIN and $\overline{CIN}$, generated as COUT and $\overline{COUT}$ from a preceding module. In module FABC2, IF TC2 = 1
    THEN $mux_A$ out = $a_{mm1} \cdot \overline{b}_{nm2}$
    ELSE $mux_A$ out = $a_{mm1} \cdot b_{nm2}$
IF TC1 = 1
    THEN $mux_B$ out = $\overline{a}_{mm2} \cdot b_{nm1}$
    ELSE $mux_B$ out = $a_{mm2} \cdot b_{nm1}$ The number 8 module, FBC1, from Table 1 is shown in FIG. 14 and comprises a primary full adder, FAPRIM, 1401 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by a NAND gate 1402 receiving as its inputs $b_{n-1}$ and control signal TC1 and inverter 1403. The inverted logical product of $b_{n-1}$ and control signal TC1 from NAND gate 1402 is the input $\overline{A}$, and the logical product output from inverter 1403 is the input A. The inputs B and $\overline{B}$ are generated by NAND gate 1404 receiving as its inputs $a_{m-1}$ and control signal TC1 and inverter 1405. The CIN and $\overline{CIN}$ inputs are generated by either of NAND gates 1406 or 1407, both of which receive as one input $a_{m-1}$. NAND gate 1407 receives as its second input $b_{n-1}$, and NAND gate 1406 receives as its second input the inverse of $b_{n-1}$ from inverter 1408. The outputs of NAND gates 1406 and 1407 are respectively input to tri-inverter buffer circuits 1409 and 1410 which function as a multiplexer passing either the output of NAND gate 1406 or the output of NAND gate 1407. The selection signal for the multiplexer is the control signal TC4 which is input to cascade inverters 1411 and 1412. The output of inverter 1411 is input as selection signal sel0f in FIG. 6, while the output of inverter 1412 is input as selection signal sel0 in FIG. 6. The input CIN to FAPRIM 1401 is directly from the outputs of tri-inverter buffers 1409 and 1410, and the input $\overline{CIN}$ is from inverter 1413. In module FAC2, IF TC4 = 1
    THEN mux out = $a_{m-1} \cdot \overline{b}_{n-1}$
    ELSE mux out = $a_{m-1} \cdot b_{n-1}$ The number 9 module, FBC1, from Table 1 is shown in FIG. 15 and comprises a primary full adder, FAPRIM, 1501 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by a NAND gate 1502 receiving as its inputs $\overline{a}_{mm1}$ and control signal TC1 and inverter 1503. The inverted logical product of $\overline{a}_{mm1}$ and control signal TC1 from NAND gate 1502 is the input $\overline{A}$, and the logical product output from inverter 1503 is the input A. The inputs B and $\overline{B}$ are generated by NAND gate 1504 receiving as its inputs $\overline{b}_{nm1}$ and control signal TC1 and inverter 1505. The CIN and $\overline{CIN}$ inputs are supplied respectively by $z_{mpnm1}$ or its inverse input to tri-inverter buffer circuits 1509 and 1510 which function as a multiplexer. The selection signal for the multiplexer is the control signal TC1 which is input to cascade inverters 1511 and 1512. The output of inverter 1511 is input as selection signal sel0f in FIG. 6, while the output of inverter 1512 is input as selection signal sel0 in FIG. 6. The input CIN to FAPRIM 1501 is directly from the outputs of tri-inverter buffers 1509 and 1510, and the input $\overline{CIN}$ is from inverter 1513.

Figure 16:
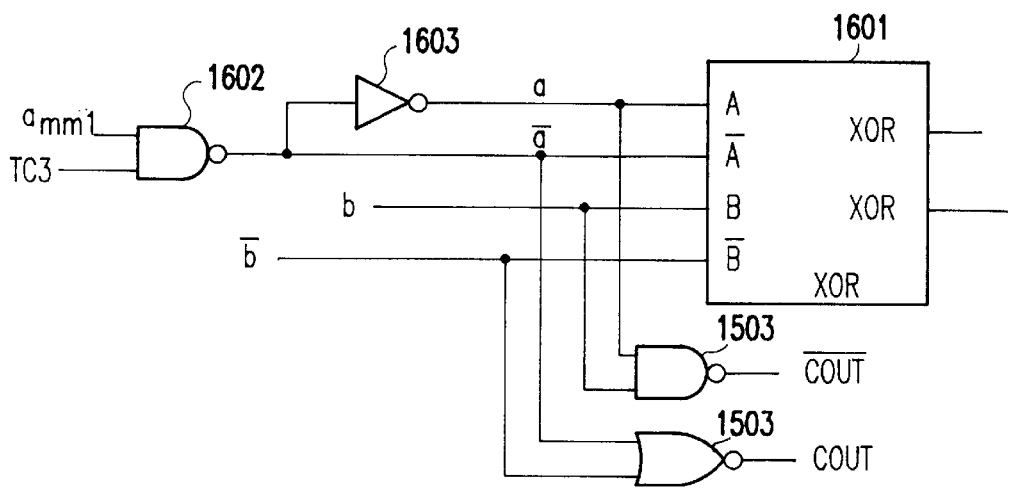
FIG. 16 is a block and logic diagram of the HAC2 module.

The number 10 module, HAC2, from Table 1 is shown in FIG. 16 and comprises an Exclusive OR circuit 1601, which here functions as a half adder. It has inputs A, $\overline{A}$, B, and $\overline{B}$, and outputs XOR and $\overline{XOR}$. The A and $\overline{A}$ are generated by NAND gate 1602 which receives as inputs $a_{mm1}$ and control signal TC3 and inverter 1603. The B and $\overline{B}$ inputs are supplied by B and $\overline{B}$ in. A NAND gate 1604 generates the inverse logical product of the output of inverter 1603 and the B input as $\overline{COUT}$, and a NOR gate 1605 generates the inverse logical sum of the output of NAND gate 1602 and the $\overline{B}$ input as COUT.

Figure 17:
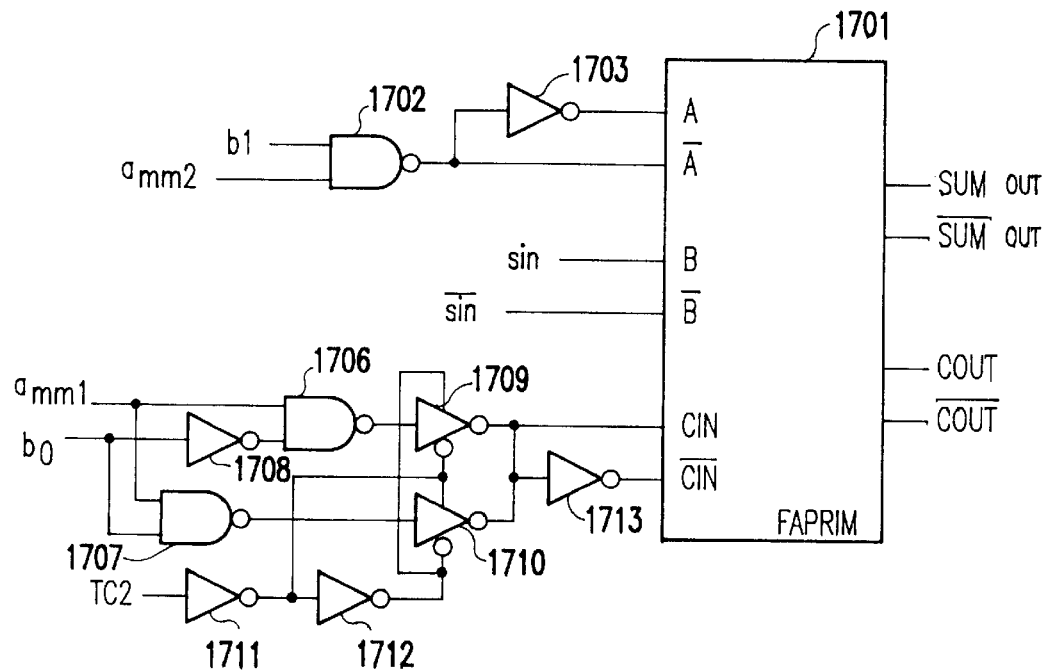
FIG. 17 is a block and logic diagram of the FBC2 module.
Figure 18:
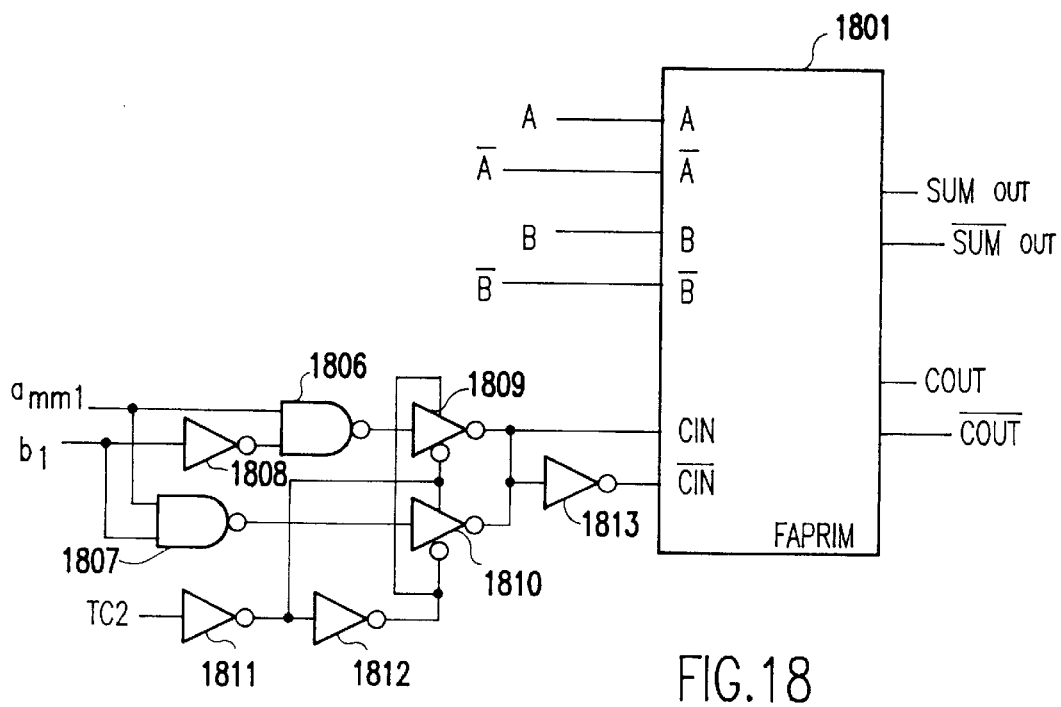
FIG. 18 is a block and logic diagram of the FBC3 module.
Figure 19:
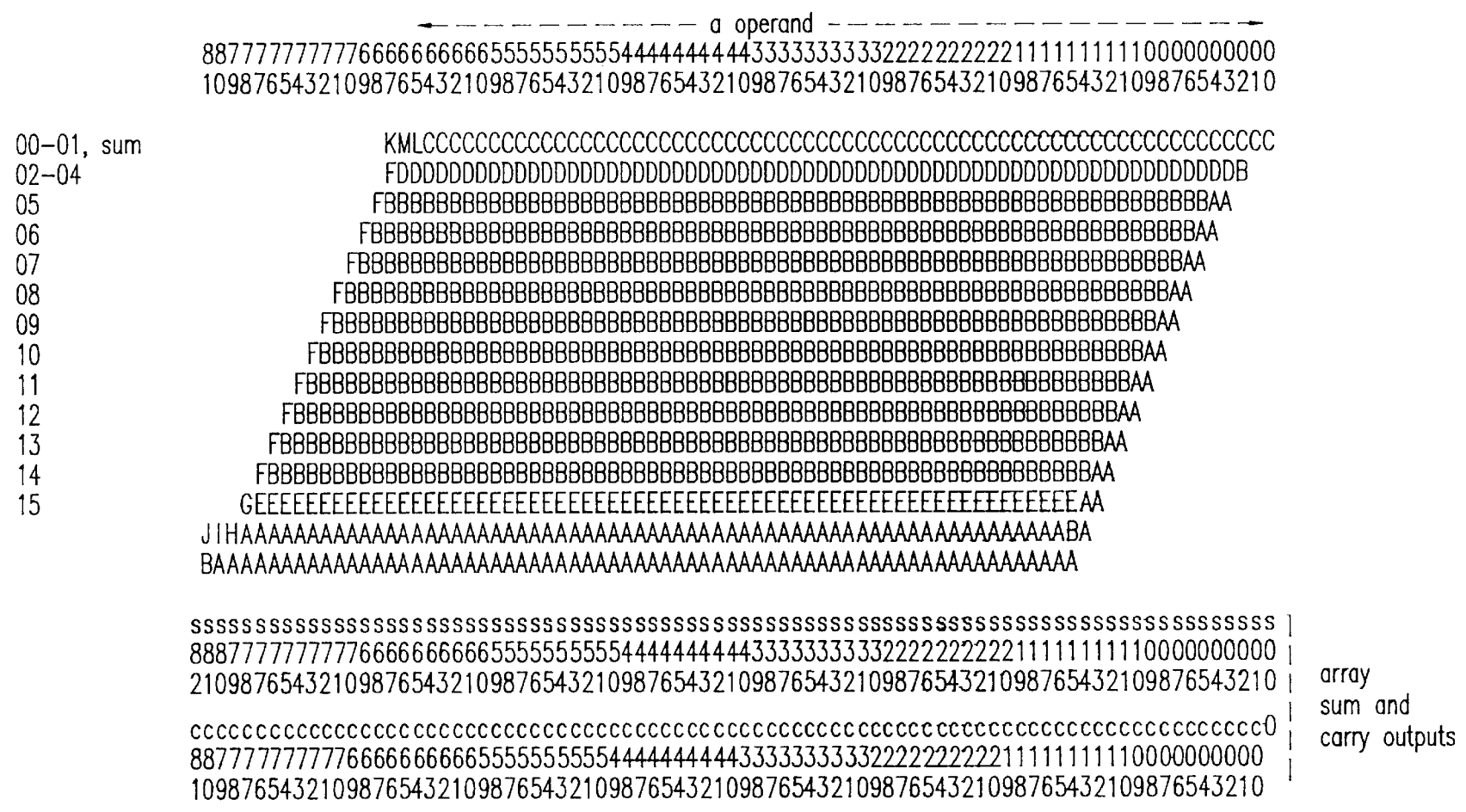
Figure 20:
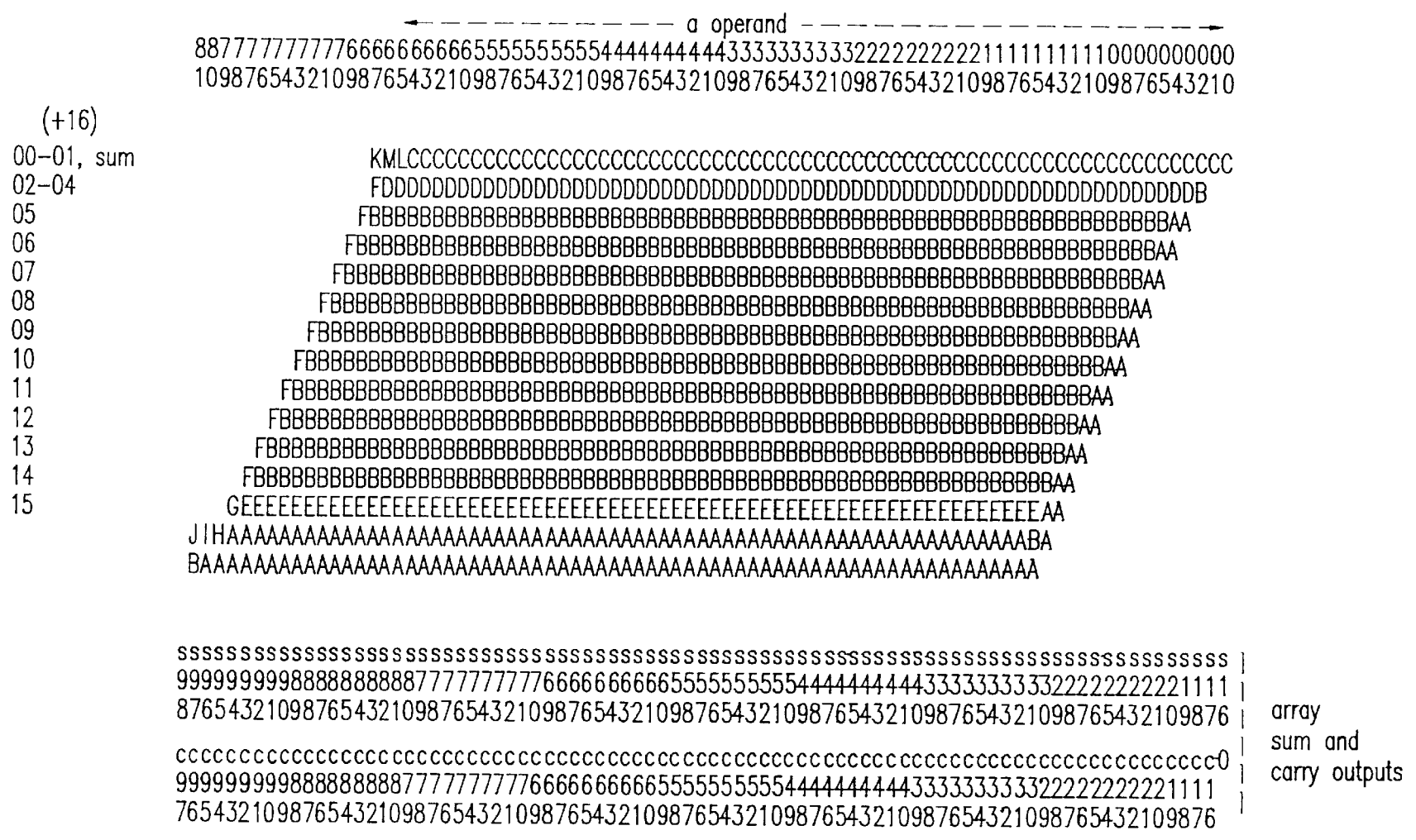

The number 11 module, FBC2, from Table 1 is shown in FIG. 17 and comprises a primary full adder, FAPRIM, 1101 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are generated by a NAND gate 1702 receiving as its inputs $a_{mm2}$ and $b_1$ and inverter 1703. The inverted logical product of $a_{mm2}$ and $b_1$ from NAND gate 1702 is the input $\overline{A}$, and the logical product output from inverter 1703 is the input A. The inputs B and $\overline{B}$ are supplied from B and $\overline{B}$ in. The CIN and $\overline{CIN}$ inputs are generated by either of NAND gates 1706 or 1707, both of which receive as one input $a_{mm1}$. NAND gate 1707 receives as its second input $b_0$, and NAND gate 1706 receives as its second input the inverse of $b_0$ from inverter 1708. The outputs of NAND gates 1706 and 1707 are respectively input to tri-inverter buffer circuits 1709 and 1710 which function as a multiplexer passing either the output of NAND gate 1706 or the output of NAND gate 1707. The selection signal for the multiplexer is the control signal TC2 which is input to cascade inverters 1711 and 1712. The output of inverter 1711 is input as selection signal sel0f in FIG. 6, while the output of inverter 1712 is input as selection signal sel0 in FIG. 6. The input CIN to FAPRIM 1701 is directly from the outputs of tri-inverter buffers 1709 and 1710, and the input $\overline{CIN}$ is from inverter 1713. In module FBC2, IF TC2 = 1
  THEN mux out = $a_{mm1} \cdot b_0$
  ELSE mux out = $a_{mm1} \cdot b_0$ The number 12 module, FBC3, from Table 1 is shown in FIG. 18 and comprises a primary full adder, FAPRIM, 1801 having inputs A, $\overline{A}$, B, $\overline{B}$, CIN, and $\overline{CIN}$, corresponding to the inputs shown in FIG. 4. The outputs are $SUM_{out}$, $\overline{SUM}_{out}$, COUT, and $\overline{COUT}$, corresponding to the outputs shown in FIG. 4. The A and $\overline{A}$ inputs are supplied by A and $\overline{A}$ in, while the inputs B and $\overline{B}$ are supplied by B and $\overline{B}$ in. The CIN and $\overline{CIN}$ inputs are generated by either of NAND gates 1806 or 1807, both of which receive as one input $a_{mm1}$. NAND gate 1807 receives as its second input $b_1$, and NAND gate 1806 receives as its second input the inverse of $b_1$ from inverter 1808. The outputs of NAND gates 1806 and 1807 are respectively input to tri-inverter buffer circuits 1809 and 1810 which function as a multiplexer passing either the output of NAND gate 1806 or the output of NAND gate 1807. The selection signal for the multiplexer is the control signal TC2 which is input to cascade inverters 1811 and 1812. The output of inverter 1811 is input as selection signal sel0f in FIG. 6, while the output of inverter 1812 is input as selection signal sel0 in FIG. 6. The input CIN to FAPRIM 1801 is directly from the outputs of tri-inverter buffers 1809 and 1810, and the input $\overline{CIN}$ is from inverter 1813. In the FBC3 module, IF TC2 = 1
  THEN mux out = $a_{mm1} \cdot \overline{b}_1$
  ELSE mux out = $a_{mm1} \cdot b_1$ The four array panels are shown in FIGS. 19 to 22 illustrate multiplication-accumulation in two's complement and unsigned modes. These figures illustrate the use of the panel to form the example 64×66 multiplier array. More specifically, they illustrate the sum and carryout position of each panel and these signal labels are necessary to understand how the adder trees sum the four panel outputs.

Figure 23:
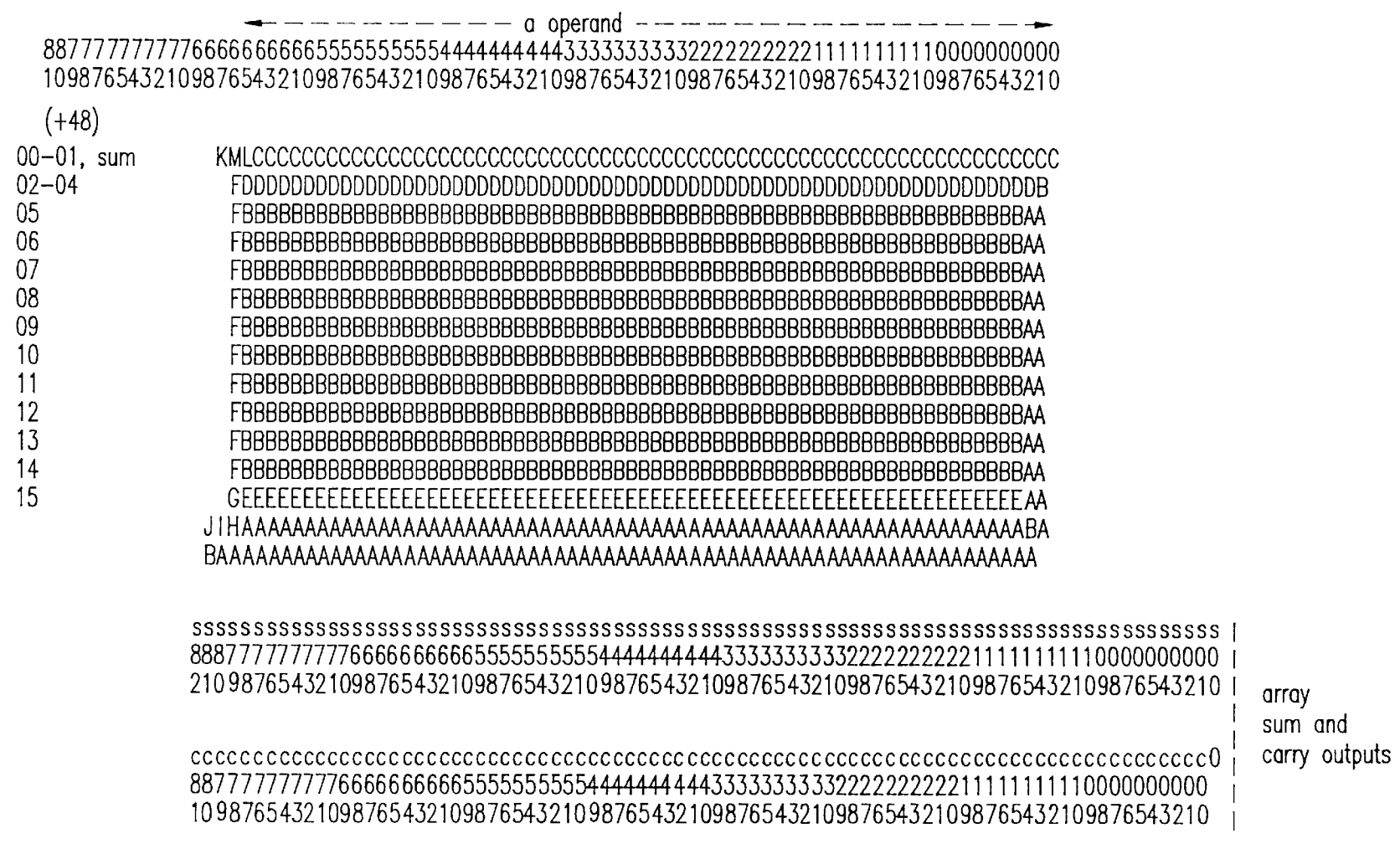

The physical design of the multiplier array panel A is shown in FIG. 23. This design is similar to that shown in FIG. 19 except that it is squared up for the most compact construction of the panel. The physical designs of multiplier array panels B, C and D are similar to that for panel A shown in FIG. 23.

The multiplier array panel outputs from each of the panels A, B, C, and D are summed via the adder tree structures (see FIG. 1) according to the bit positions as indicated in FIG. 24. FIG. 24 summarizes the sum and carry outputs from FIGS. 19 through 22. These signals are summed via the adder trees.

The multiplier accumulator of FIG. 1 forms the multiplication by summing the panels A, B, C, and D as ((A+B)+C)+D. As each panel has both sum and carry outputs, the terms in this function are each two terms, the sum and carry, associated with each output. It is important to note that the multiply accumulate could just as easily have been formed as (A+B)+(C+D). In this case, a different set of adder trees would be used, but the basic idea is the same.

Figure 25A:
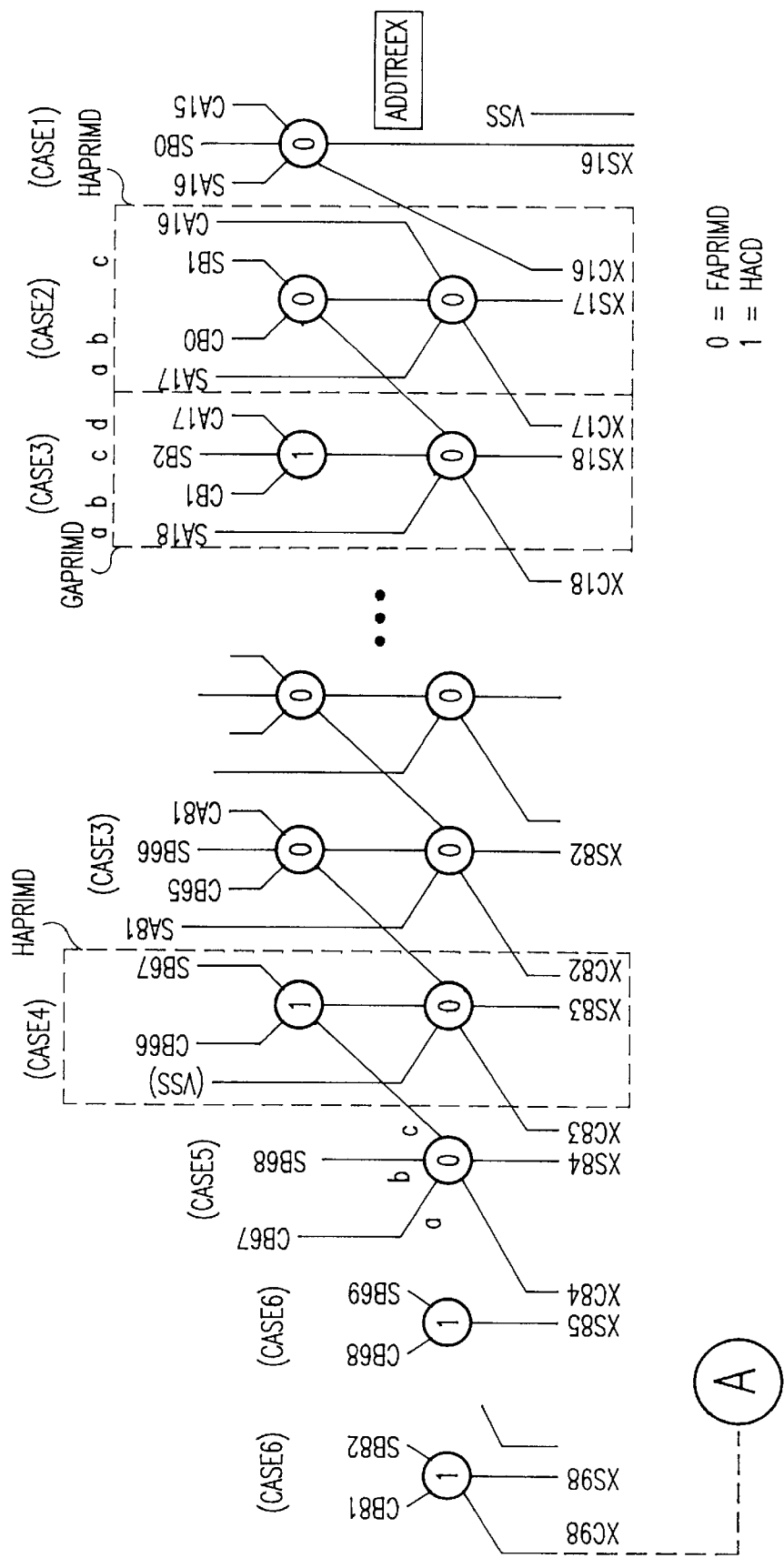
FIGS. 25A, 25B and 25C are block diagrams of the adder tree constructions used in implementing the invention.
Figure 25B:
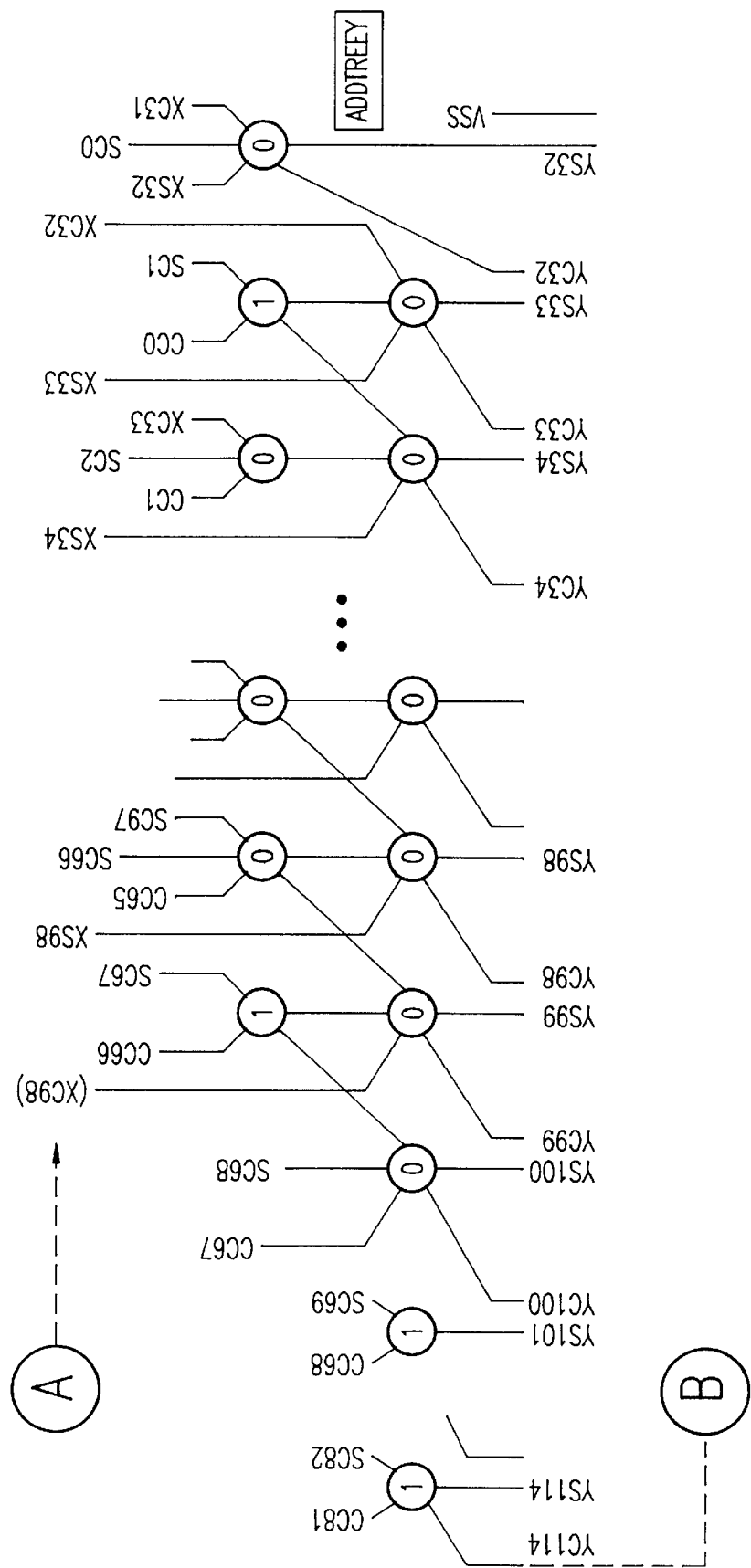
Figure 25C:
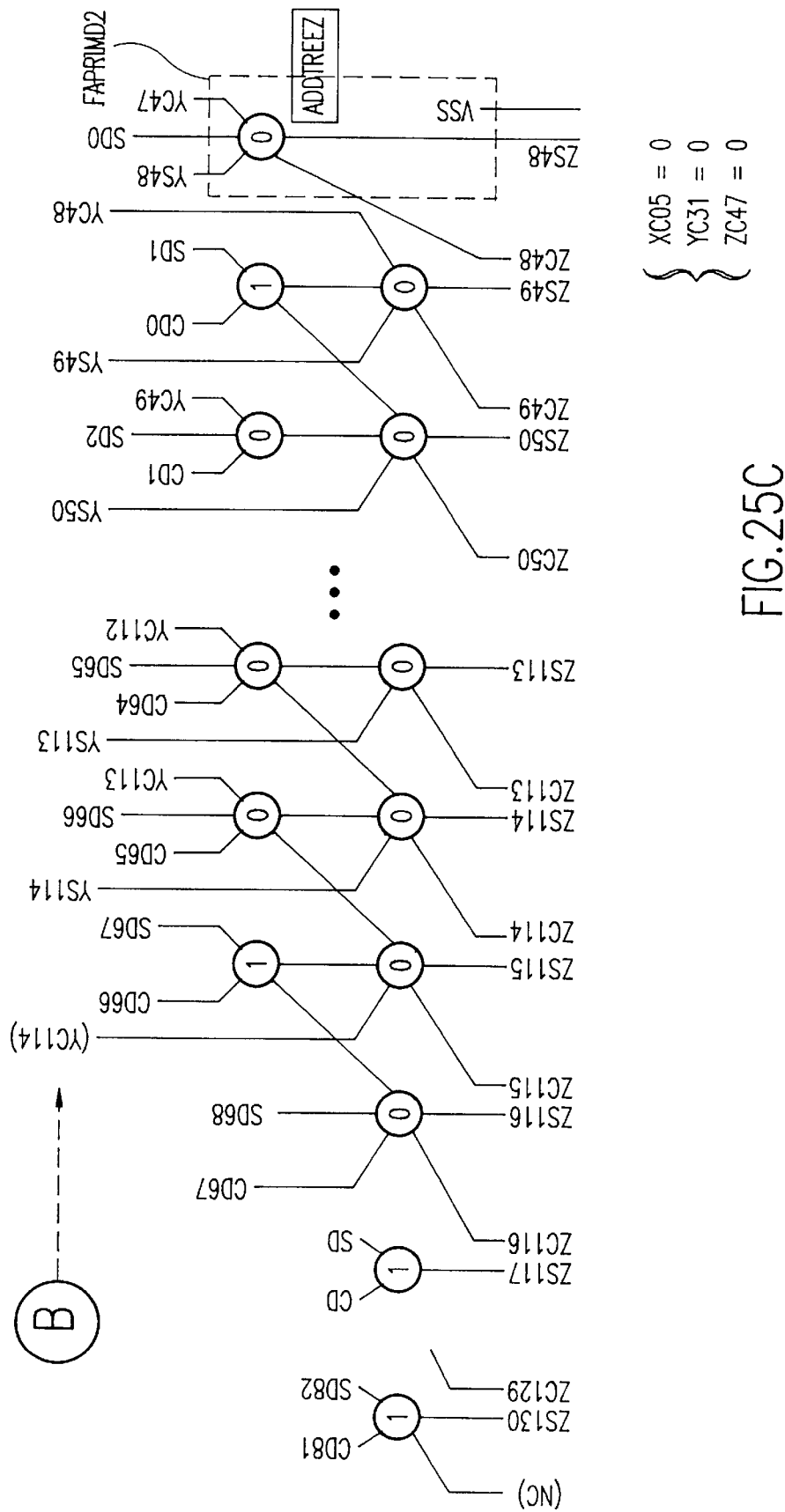

The adder tree structures 15, 16 and 17 in FIG. 1 for summing the outputs of the multiplier array panels A, B, C, and D is shown in FIGS. 25A, 25B and 25C as ADDTREEX, ADDTREEY and ADDTREEZ, respectively. ADDTREEX sums panel A and panel B and carry outputs. ADDTREEY sums panel C with the results from ADDTREEX. ADDTREEZ sums panel D with the results from ADDTREEY and provides the final sum and carry results of the composite multiply accumulate array which in turn feed the adder 18 of FIG. 1.

Figure 26:
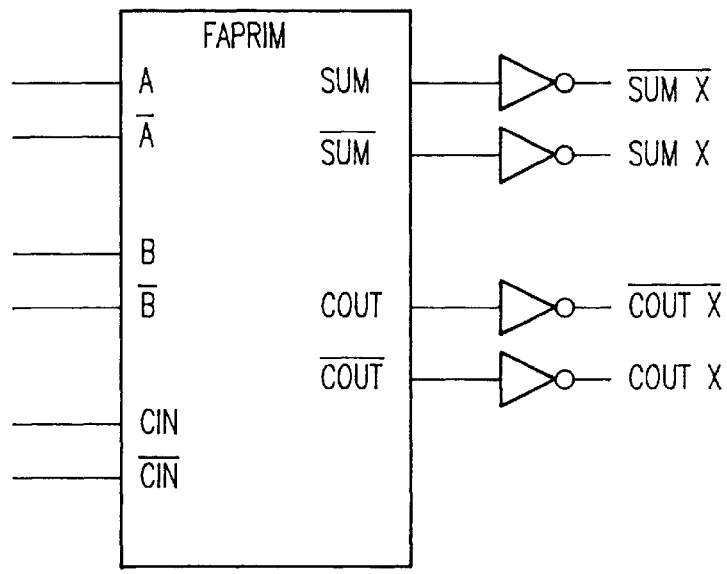
FIG. 26 is a block diagram showing the adder tree module FAPRIMD.
Figure 28:
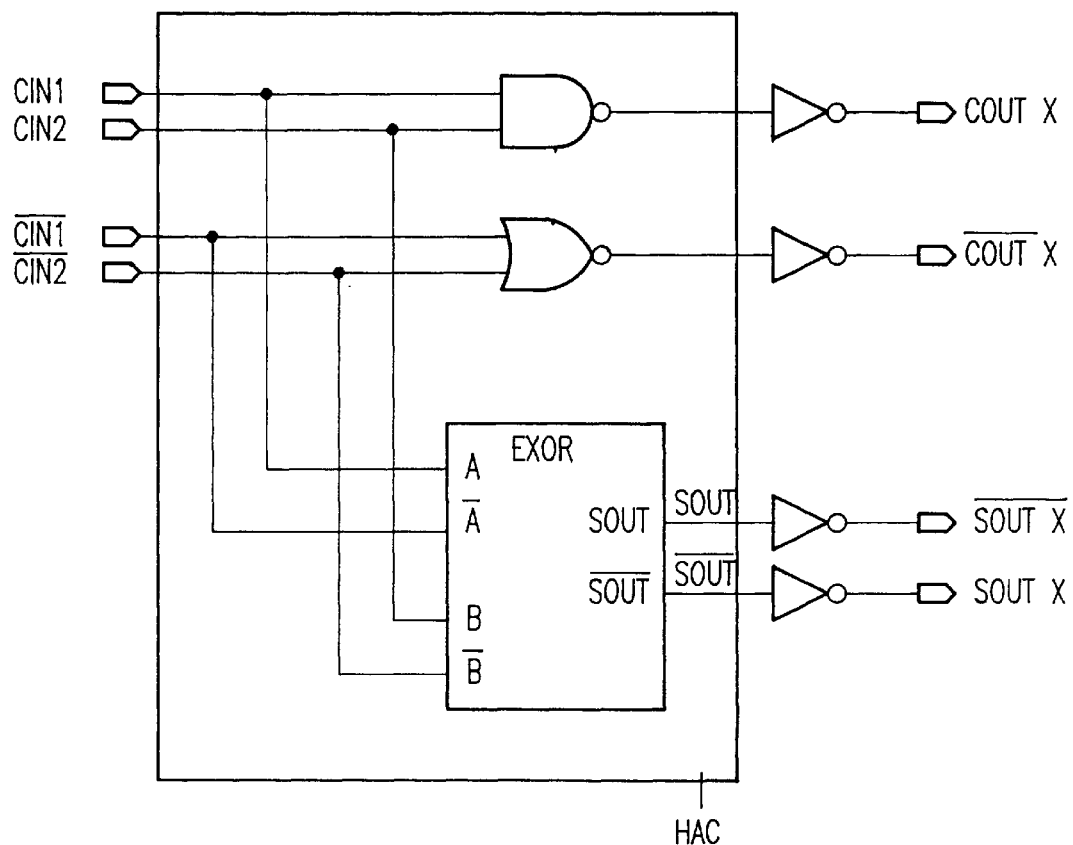
FIG. 28 is a block diagram showing the adder tree module HACD.
Figure 27:
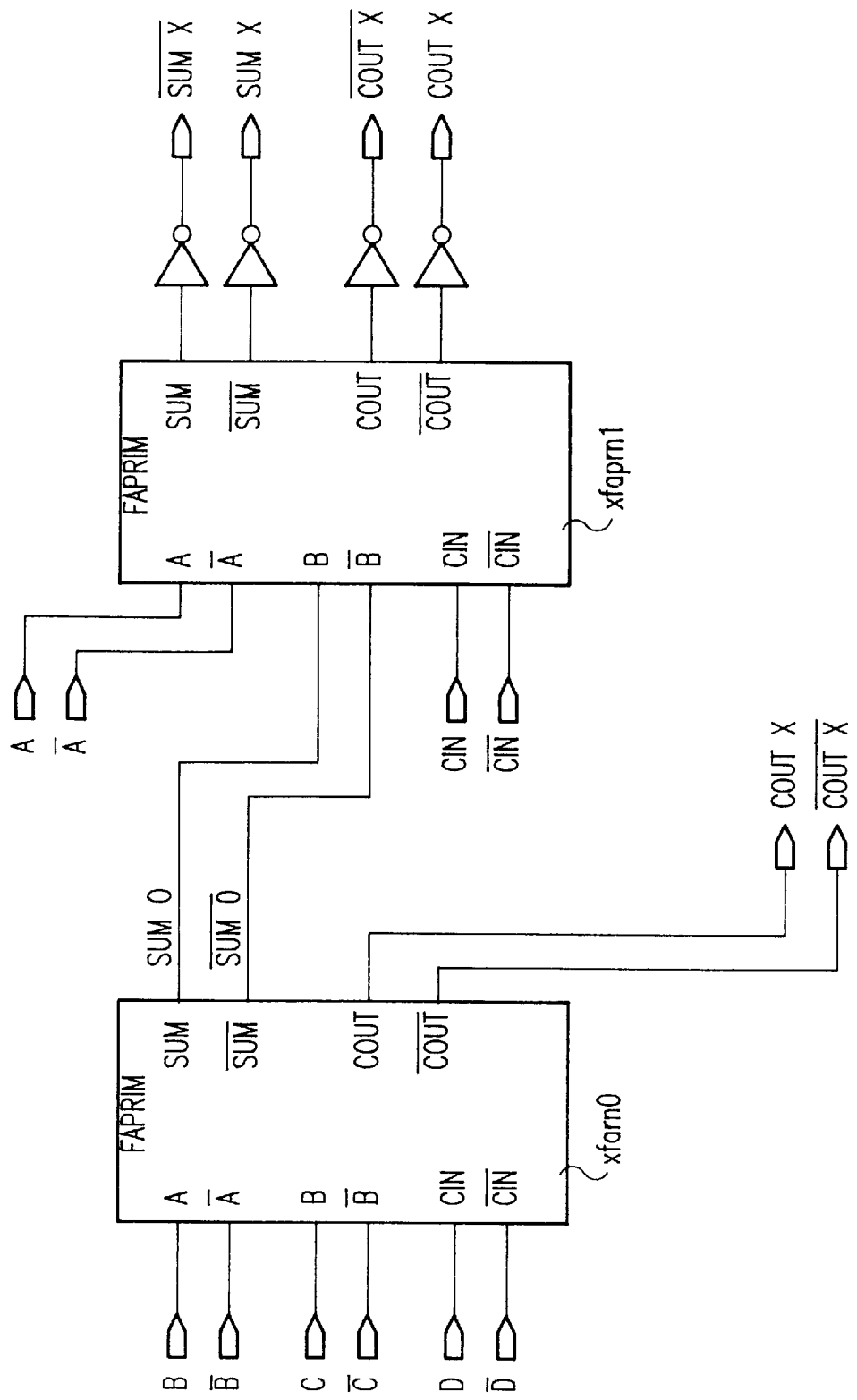
FIG. 27 is a block diagram showing the adder tree primitive GAPRIMD.
Figure 29:
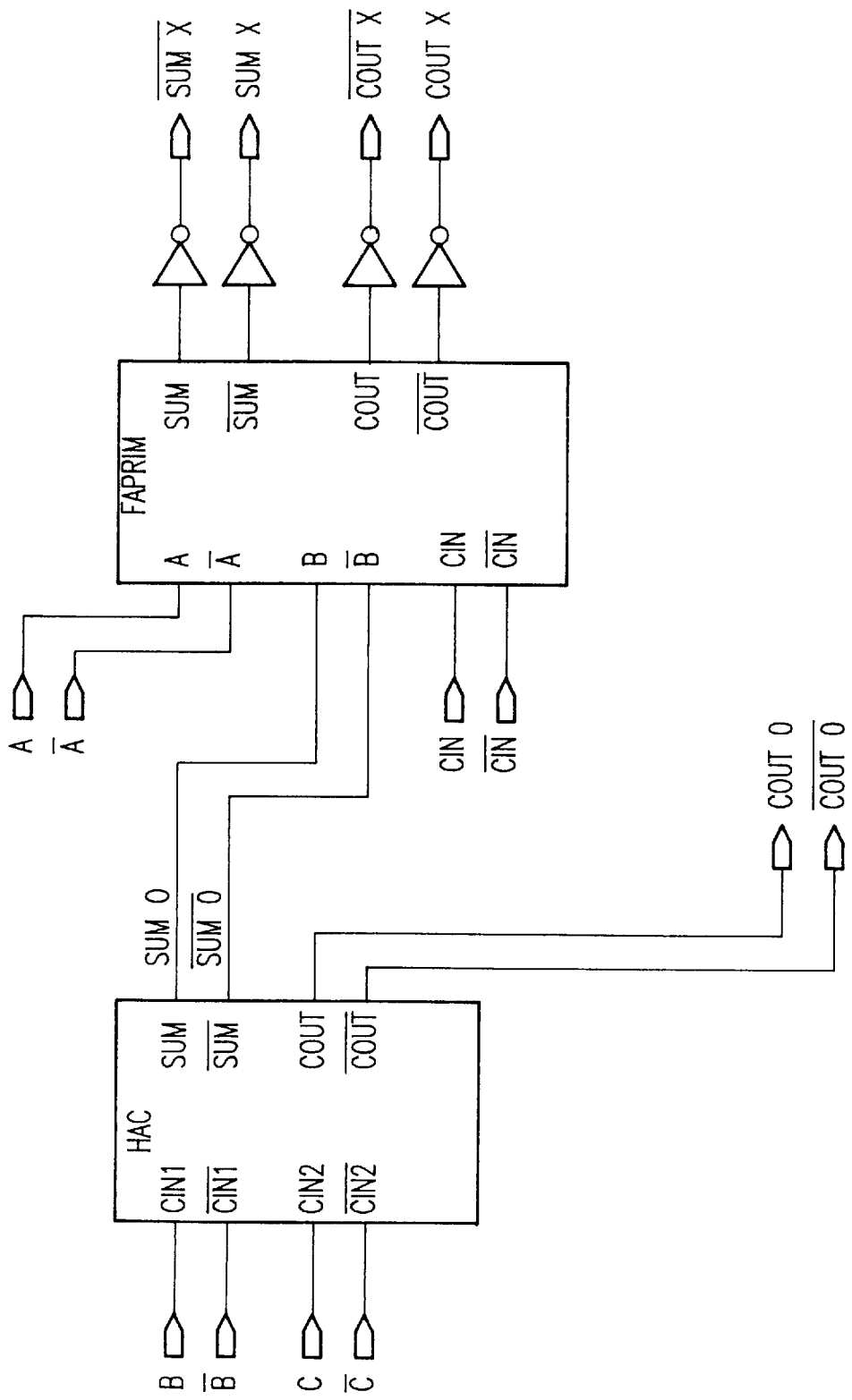
FIG. 29 is a block diagram showing the adder tree primitive HAPRIMD.

The adder trees, like the panels 11, 12, 13, and 14, are constructed of basic modules. The basic adder tree module, FAPRIMD, denoted by the numeral 0 in FIGS. 25A, 25B and 25C is shown in FIG. 26. This module is essentially identical to the FAPRIM module shown in FIG. 4 except that inverters have been added to each of the outputs in order to amplify the output signals. Two of these modules when connected in cascade form the adder tree primitive GAPRIMD shown in FIG. 27. A second adder tree module, HAC, denoted by the numeral 1 in FIGS. 25A, 25B and 25C is shown in FIG. 28. This module is similar to the HAC2 module shown in FIG. 16 except there is no control input logic and, like the FAPRIMD module, inverters have been added to each of the outputs. The combination of the HAC and FAPRIMD modules for the adder tree primitive HAPRIMD shown in FIG. 29.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A parallel multiply accumulator that provides a multiply in accordance with a multiplier mode, said multiplier mode being either two's complement or unsigned, comprising:

a plurality of identical multiplier panel arrays, each panel array having a panel position within said accumulator, each panel array further comprising a plurality of multiplier modules and receiving a first operand and respective portions of a second operand, a first panel array of said panel arrays further receiving an accumulator input, each of said panel arrays generating a first output and said first panel array additionally generating a second output;

control inputs for each of said panel arrays, said control inputs selecting one of a plurality of possible behavior modes for each of said panel arrays according to said multiplier mode and a position of said each of said panel arrays relative to others of said panel arrays;

a number of adder trees, one less than a number of said plurality of panels, respectively connected to sum the first outputs of first and second panel arrays and generating a first and second sum outputs and connected to sum the first output of a subsequent one of said panel arrays and the first sum output of a preceding adder tree and generating a first and second sum outputs; and a final adder connected to sum the second output of said first one of said panel arrays and the second outputs of said adder trees and generating a multiplier output.

2. The parallel multiply accumulator that provides a two's complement and unsigned multiply recited in claim 1 wherein compensation for utilizing a plurality of identical multiplier panel arrays to perform two's complement and unsigned multiply is provided by modules at edges of the panels, said modules receiving control signals to control multiply and accumulate operations.

3. The parallel multiply accumulator that provides a two's complement and unsigned multiply recited in claim 2 wherein there are four multiplier panel arrays identified as A, B, C, and D and the adder trees and final adder perform the summation ((A+B)+C)+D.

4. The parallel multiply accumulator that provides a two's complement and unsigned multiply recited in claim 2 wherein there are four multiplier panel arrays identified as A, B, C, and D and the adder trees and final adder perform the summation (A+B)+(C+D).

5. A parallel multiply accumulator that provides a multiply in accordance with a multiplier mode, said multiplier mode being either two's complement or unsigned comprising:

four identical multiplier panel arrays, each panel array having a panel position within said accumulator, each panel array further comprising a plurality of multiplier modules and receiving a first operand and respective portions of a second operand, a first panel of said panel arrays further receiving an accumulator input, each of said panel arrays generating a first output and said first panel array additionally generating a second output;

control inputs for each of said panel arrays, said control inputs selecting one of a plurality of possible behavior modes for each of said panel arrays according to said multiplier mode and a position of said each of said panel arrays relative to others of said panel arrays wherein compensation for utilizing said four panel arrays to perform two's complement and unsigned multiply is provided by said multiplier modules at edges of the panels;

first, second and third adder trees connected to sum the first outputs of said four panel arrays and generating a first and second sum outputs; and a final adder connected to sum the second output of said first panel array, and the second sum outputs of the first, second and third adder trees and generating a multiplier output.

6. The parallel multiply accumulator that provides a two's complement and unsigned multiply recited in claim 5 wherein the four multiplier panel arrays are identified as A, B, C, and D and the first, second and third adder trees and final adder perform the summation ((A+B)+C)+D.

7. The parallel multiply accumulator that provides a two's complement and unsigned multiply recited in claim 5 wherein the four multiplier panel arrays are identified as A, B, C, and D and the first, second and third adder trees and the final adder perform the summation (A+B)+(C+D).

8. A parallel multiply accumulator that provides a two's complement and unsigned multiply as recited in claim 5 wherein a primary module of said multiplier module comprises:

first and second Exclusive OR circuits connected to receive true and complement values of each of two inputs and generating true and complement Exclusive OR outputs, the first Exclusive OR circuit receiving inputs corresponding to operand bits from a preceding module and supplying true and complement outputs to one of the inputs of the second Exclusive OR circuit, the true and complement inputs to the second of the inputs of the second Exclusive OR circuit being supplied by carry out signals from a preceding module, the outputs of the second Exclusive OR circuit providing a sum output of the module; and first and second pairs of tri-inverter buffer circuits, each having first and second complementary select inputs, a first tri-inverter buffer circuit of said first pair receiving a true carry out signal from a preceding module and a second tri-inverter buffer circuit of said first pair receiving a true input of one of said operand bits, a first tri-inverter buffer circuit of said second pair receiving a complement of said carry out signal and a second tri-inverter buffer circuit of said second pair receiving a complement of said one of said operand bits, said first pair of tri-inverter buffer circuits generating a complement of a carry out signal and said second pair of tri-inverter buffer circuits generating said carry out signal.

9. The parallel multiply accumulator that provides a two's complement and unsigned multiply recited in claim 8 wherein said first and second Exclusive OR circuits each comprise a pair of tri-inverter buffer circuits identical to said first and second tri-inverter buffer circuits, said pair of tri-inverter buffer circuits being connected with respective inputs to true and complement of a first logic signal and respective select lines connected with true and complement of a second logic signal and outputs connected in common.

10. The parallel multiply accumulator that provides a two's complement and unsigned multiply recited in claim 9 wherein each of said tri-inverter buffer circuits comprise four field effect transistors (FETs), two of said FETs being n-channel FETs connected in series and two of said FETs being p-channel FETs connected in series, the series connected n-channel and p-channel FETs being, connected to a common drain output, gates of a first n-channel FET and a first p-channel FET being connected in common to an input, and gates of a second n-channel FET and a second p-channel FET being connected to select input of said tri-inverter buffer circuit.

11. The parallel multiply accumulator that provides a two's complement and unsigned multiply recited in claim 8 wherein modules along an edge of a panel include in addition to said primary module, logic circuitry responsive to said control signals to select inputs to the primary module depending on panel position and operation to be performed.

* * * * *